(12) United States Patent
Liu et al.

(10) Patent No.: US 11,190,984 B2
(45) Date of Patent: Nov. 30, 2021

(54) QUALITY OF SERVICE PROCESSING METHOD AND DEVICE

(71) Applicant: CHINA ACADEMY OF TELECOMMUNICATIONS TECHNOLOGY, Beijing (CN)

(72) Inventors: Aijuan Liu, Beijing (CN); Dajun Zhang, Beijing (CN); Fangli Xu, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 126 days.

(21) Appl. No.: 16/496,944

(22) PCT Filed: Feb. 26, 2018

(86) PCT No.: PCT/CN2018/077260
§ 371 (c)(1),
(2) Date: Sep. 23, 2019

(87) PCT Pub. No.: WO2018/171386
PCT Pub. Date: Sep. 27, 2018

(65) Prior Publication Data
US 2020/0107229 A1  Apr. 2, 2020

(30) Foreign Application Priority Data
Mar. 24, 2017 (CN) .......................... 201710182683.0

(51) Int. Cl.
*H04W 28/24* (2009.01)
*H04W 28/22* (2009.01)
(Continued)

(52) U.S. Cl.
CPC .......... *H04W 28/24* (2013.01); *H04W 28/22* (2013.01); *H04W 36/0044* (2013.01);
(Continued)

(58) Field of Classification Search
None
See application file for complete search history.

(56) References Cited

U.S. PATENT DOCUMENTS 8,270,353 B2 * 9/2012 Kim ...................... H04W 28/08
370/329
8,369,283 B2 * 2/2013 Park .................. H04W 36/0077
370/331
(Continued)

FOREIGN PATENT DOCUMENTS

CN  1930903 A  3/2007
CN  1951035 A  4/2007
(Continued)

OTHER PUBLICATIONS

Written Opinion of the International Searching Authority from PCT/CN2018/077260, dated May 30, 2018, with English translation from WIPO.
(Continued)

*Primary Examiner* — Bunjob Jaroenchonwanit
(74) *Attorney, Agent, or Firm* — Ladas & Parry, LLP

(57) ABSTRACT

Provided in embodiments of the present disclosure a QoS processing method and a QoS processing device. The QoS processing method includes transmitting, by a target base station, a first message to a source base station. The first message at least comprises first information and second information; the first information is configured for notifying the source base station that the target base station is incapable of meeting a QoS requirement on one or more flows of a UE; and the second information is information of a QoS parameter capable of being accepted by the target base station and recommended with respect to the one or more flows.

12 Claims, 16 Drawing Sheets

(51) Int. Cl.
*H04W 36/00* (2009.01)
*H04W 36/02* (2009.01)
*H04W 36/08* (2009.01)
*H04W 36/26* (2009.01)

(52) U.S. Cl.
CPC ......... *H04W 36/023* (2013.01); *H04W 36/08* (2013.01); *H04W 36/26* (2013.01)

(56) References Cited

U.S. PATENT DOCUMENTS

| | | | | |
|---|---|---|---|---|
| 8,477,726 | B2* | 7/2013 | Li | H04W 36/38 370/331 |
| 8,514,810 | B2* | 8/2013 | Youn | H04W 36/30 370/331 |
| 2005/0101326 | A1* | 5/2005 | Kang | H04W 36/305 455/436 |
| 2005/0239465 | A1* | 10/2005 | Lee | H04W 36/26 455/436 |
| 2005/0250498 | A1* | 11/2005 | Lim | H04W 36/26 455/436 |
| 2005/0286470 | A1* | 12/2005 | Asthana | H04W 36/12 370/331 |
| 2006/0002345 | A1* | 1/2006 | Lapraye | H04W 36/14 370/331 |
| 2006/0111111 | A1* | 5/2006 | Ovadia | H04W 36/38 455/439 |
| 2007/0291699 | A1 | 12/2007 | Lee et al. | |
| 2009/0011783 | A1* | 1/2009 | Kitazoe | H04W 8/22 455/517 |
| 2010/0040023 | A1* | 2/2010 | Gallagher | H04W 8/02 370/331 |
| 2010/0091739 | A1* | 4/2010 | Dayal | H04L 1/0026 370/332 |
| 2011/0243096 | A1* | 10/2011 | Brandt | H04W 36/0055 370/331 |
| 2011/0317617 | A1* | 12/2011 | Sun | H04B 7/155 370/315 |
| 2012/0039305 | A1* | 2/2012 | Han | H04W 36/245 370/332 |
| 2013/0014210 | A1* | 1/2013 | Arnott | H04W 12/08 726/1 |
| 2013/0163454 | A1* | 6/2013 | Liang | H04W 36/0055 370/252 |
| 2013/0223408 | A1* | 8/2013 | Brandt | H04W 36/0055 370/331 |
| 2013/0337811 | A1* | 12/2013 | Faerber | H04W 36/0083 455/436 |
| 2014/0106757 | A1* | 4/2014 | Hakola | H04W 76/23 455/440 |
| 2014/0120921 | A1* | 5/2014 | Keskitalo | H04W 36/305 455/438 |
| 2015/0043432 | A1* | 2/2015 | Zou | H04W 16/10 370/328 |
| 2015/0063101 | A1* | 3/2015 | Touati | H04W 28/0268 370/230 |
| 2015/0208283 | A1* | 7/2015 | Yang | H04W 36/04 370/331 |
| 2015/0358865 | A1* | 12/2015 | Fu | H04W 36/0058 455/436 |
| 2016/0037406 | A1* | 2/2016 | Centonza | H04W 36/08 370/332 |
| 2017/0164231 | A1* | 6/2017 | Quan | H04W 28/24 |
| 2017/0318510 | A1* | 11/2017 | Guo | H04W 8/22 |
| 2018/0115927 | A1* | 4/2018 | Vesterinen | H04W 36/0055 |
| 2018/0248708 | A1* | 8/2018 | Won | H04W 4/06 |
| 2018/0288661 | A1* | 10/2018 | Liang | H04W 36/0077 |
| 2019/0174360 | A1* | 6/2019 | Pang | H04W 72/1226 |
| 2019/0182752 | A1* | 6/2019 | Lou | H04W 48/08 |
| 2019/0215735 | A1 | 7/2019 | Wang et al. | |
| 2019/0261240 | A1* | 8/2019 | Fang | H04W 36/0027 |
| 2019/0349774 | A1* | 11/2019 | Lou | H04W 48/08 |
| 2019/0350027 | A1* | 11/2019 | Centonza | H04W 88/06 |
| 2019/0357076 | A1* | 11/2019 | Han | H04W 28/0268 |
| 2020/0015116 | A1* | 1/2020 | Huang | H04W 28/02 |
| 2020/0092776 | A1* | 3/2020 | Edge | H04W 8/12 |
| 2020/0196169 | A1* | 6/2020 | Dao | H04W 24/08 |
| 2020/0245205 | A1* | 7/2020 | Park | H04W 36/0077 |
| 2020/0329413 | A1* | 10/2020 | Xu | H04W 36/26 |

FOREIGN PATENT DOCUMENTS

| | | |
|---|---|---|
| CN | 101778431 A | 7/2010 |
| CN | 101990221 A | 3/2011 |
| CN | 102131256 A | 7/2011 |
| CN | 105472659 A | 4/2016 |
| CN | 107734563 A | 2/2018 |

OTHER PUBLICATIONS

International Search Report from PCT/CN2018/077260, dated May 30, 2018, with English translation from WIPO.
International Preliminary Report on Patentability from PCT/CN2018/077260, dated Sep. 24, 2019, with English translation from WIPO.
First Office Action from CN app. No. 201710182683.0, dated Dec. 20, 2018, with English translation from Global Dossier.
Extended European Search Report from EP app. No. 18771369.8, dated Dec. 12, 2019.
"Flow based QoS during Handover", R3-170253, 3GPP TSG-RAN WG3 NR Ad-hoc, Spokane, Washington, USA, Jan. 17-19, 2017.
3rd Generation Partnership Project; Technical Specification Group Radio Access Network; Study on New Radio Access Technology; Radio Access Architecture and Interfaces (Release 14), 3GPP TR 38.801 VI.0.0, Dec. 2016.
"QOS Flow Architecture", R3-170097, 3GPP TSG-RAN WG3 NR Ad-hoc, Spokane, Washington, USA, Jan. 17-19, 2017.
"QoS Modification during Intra-radio Access Handover in Lte_Active", R3-060249, 3GPP TSG-RAN WG3#51, Denver, USA, Feb. 13-17, 2006.

* cited by examiner

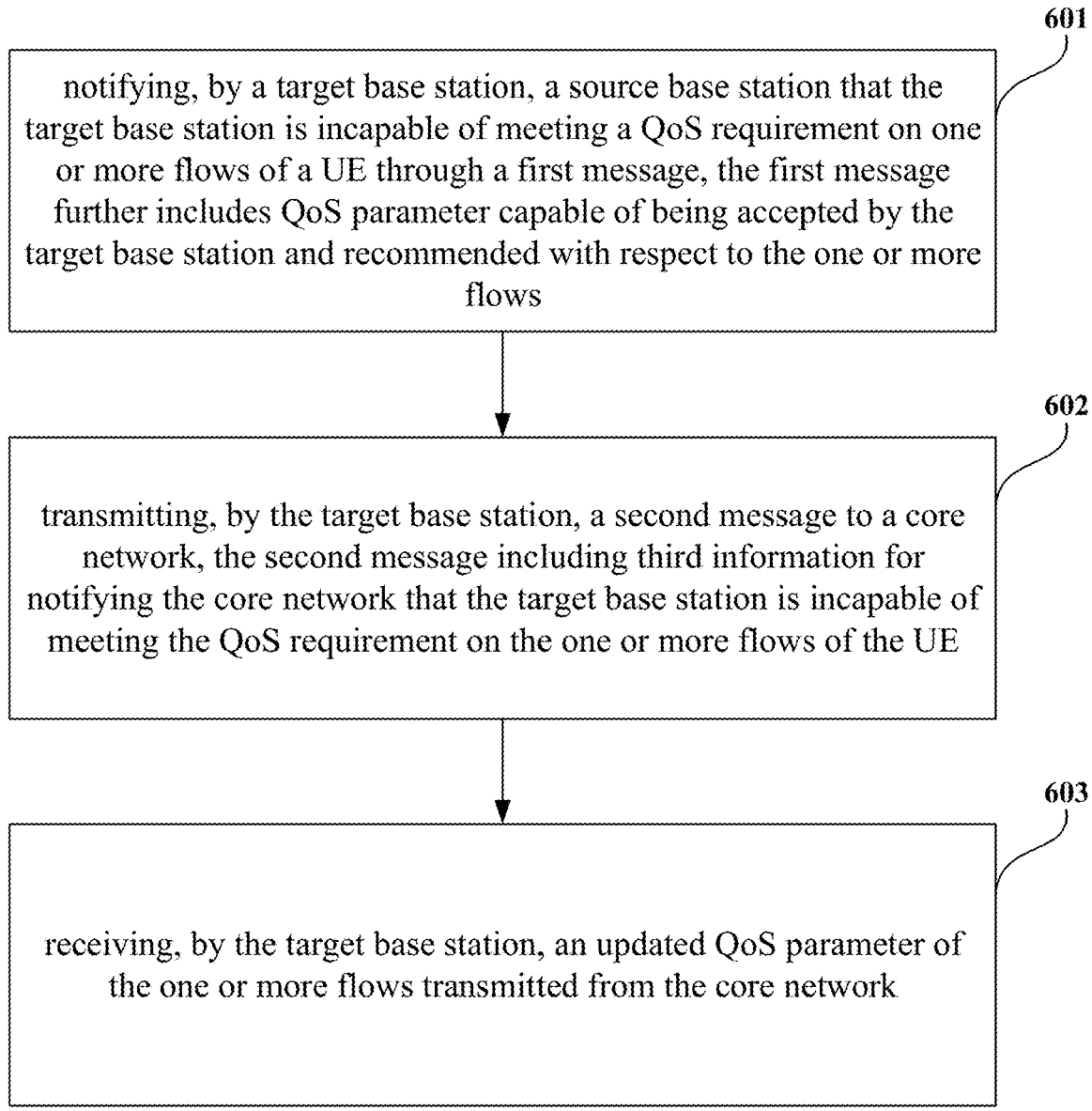

receiving, by a core network, a fourth message transmitted from a target base station, and acquiring, by the core network, seventh information from the fourth message, the seventh information being configured for notifying the core network that the target base station is incapable of meeting a QoS requirement on one or more flows of a UE

QUALITY OF SERVICE PROCESSING METHOD AND DEVICE

CROSS-REFERENCE TO RELATED APPLICATIONS

The present application is the U.S. national phase of PCT/CN2018/077260 filed on Feb. 26, 2018 which claims a priority to the Chinese patent application No. 201710182683.0 filed on Mar. 24, 2017, the disclosures of which are incorporated by reference herein in their entireties.

TECHNICAL FIELD

The present disclosure relates to the field of communication technology, in particular to a Quality of Service (QoS) processing method and a QoS processing device in a handover scenario or a Protocol Data Unit (PDU) session establishment scenario.

BACKGROUND

In a handover process of a related Long Term Evolution (LTE) system, a target base station determines whether the target base station is capable of accepting all bearers of a User Equipment (UE) in accordance with its load and a radio situation. When it is incapable of accepting all the bearers of the UE, the target base station notifies a source base station of the bearers that are incapable of being accepted through a handover response message, and the source base station needs to deactivate these bearers, so some services are incapable of being supported.

When a same mechanism is adopted in a $5^{th}$-Generation (5G) system, some flows may probably be deactivated in the handover process.

SUMMARY

In view of the above technical problems, embodiments of the present disclosure is to provide a QoS processing method and a QoS processing device, so as to prevent one or more flows from being directly deactivated when a target base station is incapable of meeting a QoS parameter of the one or more flows of a UE.

In one aspect, the present disclosure provides in some embodiments a QoS processing method, including transmitting, by a target base station, a first message to a source base station. The first message at least includes first information and second information; the first information is configured for notifying the source base station that the target base station is incapable of meeting a QoS requirement on one or more flows of a UE; and the second information is information of a QoS parameter capable of being accepted by the target base station and recommended with respect to the one or more flows.

In a possible embodiment of the present disclosure, the QoS processing method further includes transmitting, by the target base station, a second message to a core network. The second message includes third information; and the third information is configured for notifying the core network that the target base station is incapable of meeting the QoS requirement on the one or more flows of the UE.

In a possible embodiment of the present disclosure, the second message further includes fourth information; and the fourth information is information of the QoS parameter capable of being accepted by the target base station and recommended with respect to the one or more flows.

In a possible embodiment of the present disclosure, the QoS processing method further includes receiving, by the target base station, an updated QoS parameter of the one or more flows transmitted from the core network.

In another aspect, the present disclosure provides in some embodiments a QoS processing method, including: receiving, by a source base station, a first message transmitted from a target base station, and acquiring, by the source base station, first information from the first message; and transmitting, by the source base station, a third message to a core network. The first information is configured for notifying the source base station that the target base station is incapable of meeting a QoS requirement on one or more flows of a UE; the third message includes fifth information; the fifth information is configured for notifying the core network that the target base station is incapable of meeting the QoS requirement on the one or more flows of the UE; the first message further includes second information; and the second information is information of a QoS parameter capable of being accepted by the target base station and recommended with respect to the one or more flows.

In a possible embodiment of the present disclosure, the third message further includes sixth information; and the sixth information is information of the QoS parameter capable of being accepted by the target base station and recommended with respect to the one or more flows.

In a possible embodiment of the present disclosure, the QoS processing method further includes: receiving, by the source base station, an updated QoS parameter of the one or more flows transmitted from the core network; and selecting, by the source base station, a proper target base station in accordance with the updated QoS parameter of the one or more flows, to reinitiate a handover process.

In yet another aspect, the present disclosure provides in some embodiments a QoS processing method, including transmitting, by a target base station, a fourth message to a core network. The fourth message includes seventh information; and the seventh information is configured for notifying the core network that the target base station is incapable of meeting a QoS requirement on one or more flows of a UE.

In a possible embodiment of the present disclosure, the fourth message further includes eighth information; and the eighth information is information of a QoS parameter capable of being accepted by the target base station and recommended with respect to the one or more flows.

In a possible embodiment of the present disclosure, the QoS processing method further includes receiving, by the target base station, an updated QoS parameter of the one or more flows transmitted from the core network.

In a possible embodiment of the present disclosure, the QoS processing method further includes receiving, by the target base station, a handover request message transmitted from a source base station via the core network.

In still yet another aspect, the present disclosure provides in some embodiments a QoS processing method, including receiving, by a core network, a fourth message transmitted from a target base station. The fourth message includes seventh information; and the seventh information is configured for notifying the core network that the target base station is incapable of meeting a QoS requirement on one or more flows of a UE.

In a possible embodiment of the present disclosure, the fourth message further includes eighth information; and the eighth information is information of a QoS parameter capable of being accepted by the target base station and recommended with respect to the one or more flows.

In a possible embodiment of the present disclosure, the QoS processing method further includes: transmitting, by the core network, an updated QoS parameter of the one or more flows to the target base station; and receiving, by the core network, a handover response message transmitted from the target base station.

In a possible embodiment of the present disclosure, the QoS processing method further includes transmitting, by the core network, a fifth message to a source base station. The fifth message includes ninth information indicating the update QoS parameter of the one or more flows.

In still yet another aspect, the present disclosure provides in some embodiments a QoS processing device for a target base station, including a first notification module configured to transmit a first message to a source base station. The first message at least includes first information and second information; the first information is configured for notifying the source base station that the target base station is incapable of meeting a QoS requirement on one or more flows of a UE; and the second information is information of a QoS parameter capable of being accepted by the target base station and recommended with respect to the one or more flows.

In a possible embodiment of the present disclosure, the QoS processing device further includes a second notification module configured to transmit a second message to a core network. The second message includes third information; and the third information is configured for notifying the core network that the target base station is incapable of meeting the QoS requirement on the one or more flows of the UE.

In a possible embodiment of the present disclosure, the second message further includes fourth information; and the fourth information is information of the QoS parameter capable of being accepted by the target base station and recommended with respect to the one or more flows.

In a possible embodiment of the present disclosure, the QoS processing device further includes a first reception module configured to receive an updated QoS parameter of the one or more flows transmitted from the core network.

In still yet another aspect, the present disclosure provides in some embodiments a QoS processing device for a source base station, including: a second reception module configured to receive a first message transmitted from a target base station, and acquire first information from the first message; and a third notification module configured to transmit a third message to a core network. The first information is configured for notifying the source base station that the target base station is incapable of meeting a QoS requirement on one or more flows of a UE; the third message includes second information; the second information is configured for notifying the core network that the target base station is incapable of meeting the QoS requirement on the one or more flows of the UE; the first message further includes second information; and the second information is information of a QoS parameter capable of being accepted by the target base station and recommended with respect to the one or more flows.

In a possible embodiment of the present disclosure, the third message further includes sixth information; and the sixth information is information of the QoS parameter capable of being accepted by the target base station and recommended with respect to the one or more flows.

In a possible embodiment of the present disclosure, the QoS processing device further includes: a third reception module configured to receive an updated QoS parameter of the one or more flows transmitted from the core network; and a handover module configured to select a proper target base station in accordance with the updated QoS parameter of the one or more flows, to reinitiate a handover process.

In still yet another aspect, the present disclosure provides in some embodiments a QoS processing device for a target base station, including a fourth notification module configured to transmit a fourth message to a core network. The fourth message includes seventh information; and the seventh information is configured for notifying the core network that the target base station is incapable of meeting a QoS requirement on one or more flows of a UE.

In a possible embodiment of the present disclosure, the fourth message further includes eighth information; and the eighth information is information of a QoS parameter capable of being accepted by the target base station and recommended with respect to the one or more flows.

In a possible embodiment of the present disclosure, the QoS processing device further includes a fourth reception module configured to receive an updated QoS parameter of the one or more flows transmitted from the core network.

In a possible embodiment of the present disclosure, the QoS processing device further includes a fifth reception module configured to receive a handover request message transmitted from a source base station via the core network.

In still yet another aspect, the present disclosure provides in some embodiments a QoS processing device for a core network, including a sixth reception module configured to receive a fourth message transmitted from a target base station. The fourth message includes seventh information; and the seventh information is configured for notifying the core network that the target base station is incapable of meeting a QoS requirement on one or more flows of a UE.

In a possible embodiment of the present disclosure, the fourth message further includes eighth information; and the eighth information is information of a QoS parameter capable of being accepted by the target base station and recommended with respect to the one or more flows.

In a possible embodiment of the present disclosure, the QoS processing device further includes: a first transmission module configured to transmit updated QoS parameter of the one or more flows to the target base station; and a seventh reception module configured to receive a handover response message transmitted from the target base station.

In a possible embodiment of the present disclosure, the QoS processing device further includes a second transmission module configured to transmit a fifth message to a source base station. The fifth message carries ninth information indicating the update QoS parameter of the one or more flows.

In still yet another aspect, the present disclosure provides in some embodiments a base station, including a memory, a processor, and a computer program stored in the memory and executed by the processor. The processor is configured to execute the computer program so as to implement the steps of the above-mentioned QoS processing method.

In still yet another aspect, the present disclosure provides in some embodiments a core network side device, including a memory, a processor, and a computer program stored in the memory and executed by the processor. The processor is configured to execute the computer program so as to implement the steps of the above-mentioned QoS processing method.

In still yet another aspect, the present disclosure provides in some embodiments a computer-readable storage medium storing therein a computer program (instruction). The computer program (instruction) is executed by a processor so as to implement the steps of the above-mentioned QoS processing method.

A solution of the above technical solutions has following advantages or beneficial effects. A processing procedure may be provided when the target base station is incapable of meeting the QoS requirement. For example, the QoS parameter capable of being accepted by the target base station and recommended with respect to the one or more flows may be carried in the first message, so that the target base station may notify the source base station of the QoS parameter capable of being accepted by the target base station when notifying the source base station that the target base station is incapable of meeting the QoS requirement on the one or more flows of the UE. As a result, it is able to prevent the source base station from directly deactivating the bearers incapable of being accepted by the target base station as compared with the related art, thereby to enable the target base station to support a corresponding service.

BRIEF DESCRIPTION OF THE DRAWINGS

In order to illustrate the technical solutions of the present in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort. Shapes and sizes of the members in the drawings are for illustrative purposes only, but shall not be used to reflect any actual scale.

FIG. 5 is a flow chart of a QoS processing method according to an embodiment of the present disclosure;

FIG. 6 is a flow chart of the QoS processing method according to another embodiment of the present disclosure;

FIG. 11 is a flow chart of a QoS processing method according to an embodiment of the present disclosure;

DETAILED DESCRIPTION

The present disclosure will be described hereinafter in conjunction with the drawings and embodiments. It should be appreciated that, the following embodiments are for illustrative purposes only, but shall not be used to limit the scope of the present disclosure. Actually, the embodiments are provided so as to facilitate the understanding of the scope of the present disclosure, and convey the scope of the present disclosure completely to a person skilled in the art.

(1) Bearer Model in a LTE System in Related Art

Figure 1:
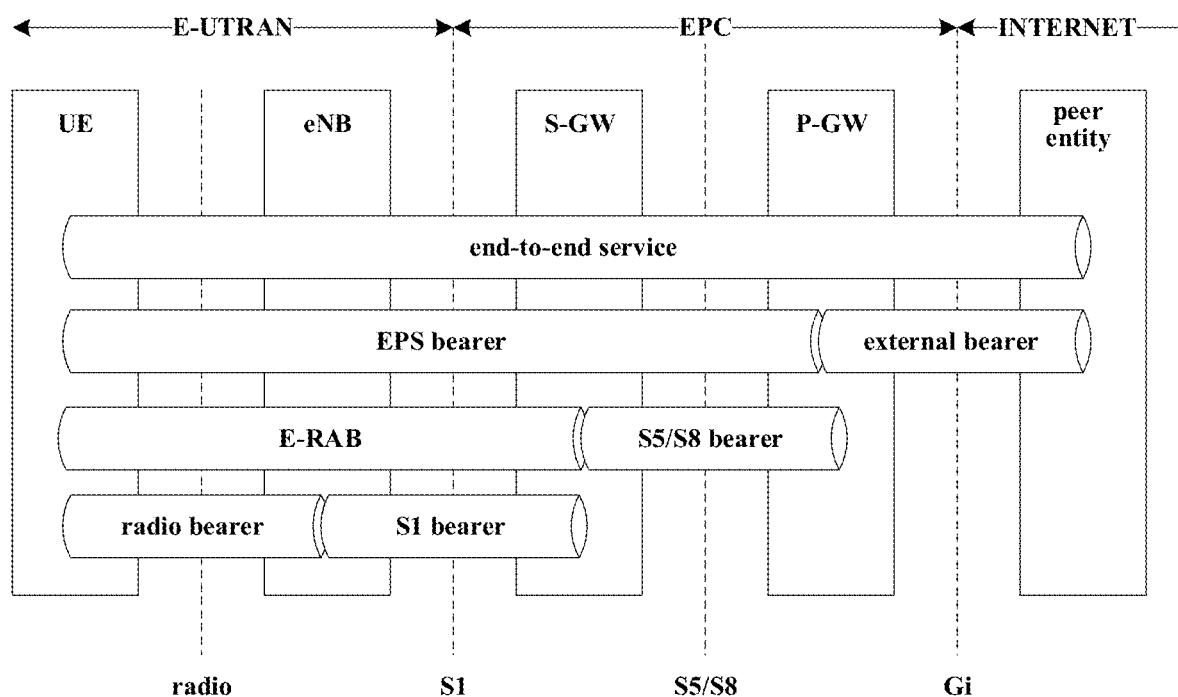
FIG. 1 is a schematic view showing a bearer model in a LTE system in related art.

FIG. 1 shows a bearer model in a LTE system in related art. In the LTE system in related art, a core network takes charge of generating a QoS parameter of an Evolved Radio Access Bearer (E-RAB). There is a one-to-one mapping relationship between air-interface Radio Bearers (RBs) and the E-RABs, so the QoS parameter of the E-RAB generated by the core network is directly adopted as a QoS parameter of the air-interface RB.

(2) RAN Side Architecture

The scheme in the embodiments of the present disclosure may be applied to different network deployment structures. For ease of description, two possible network deployment structures for a future mobile communication system will be described hereinafter.

Deployment Structure 1: Base Station+UE

Figure 2:
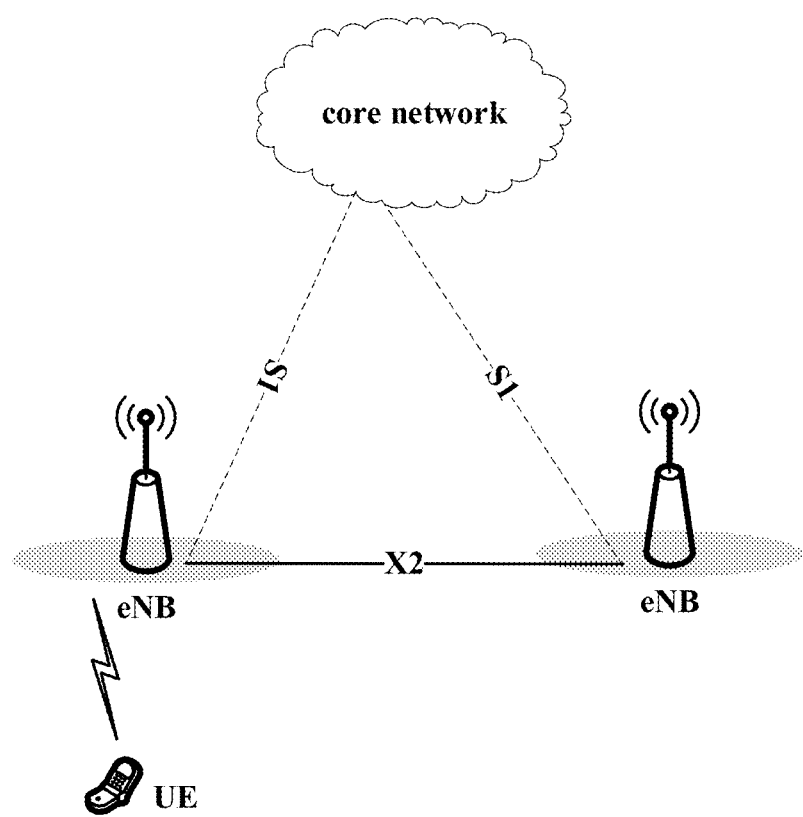
FIG. 2 is a schematic view showing a LTE architecture in related art.

FIG. 2 shows typical LTE architecture. A plurality of cells is located within the coverage of an evolved Node B (eNB), and each UE in a connected state receives data from or transmits data to a cell via an air interface.

Deployment structure 2: network side nodes include a Central Unit (CUs) and Distributed Units (DUs), and a UE side node includes a UE.

Figure 3:
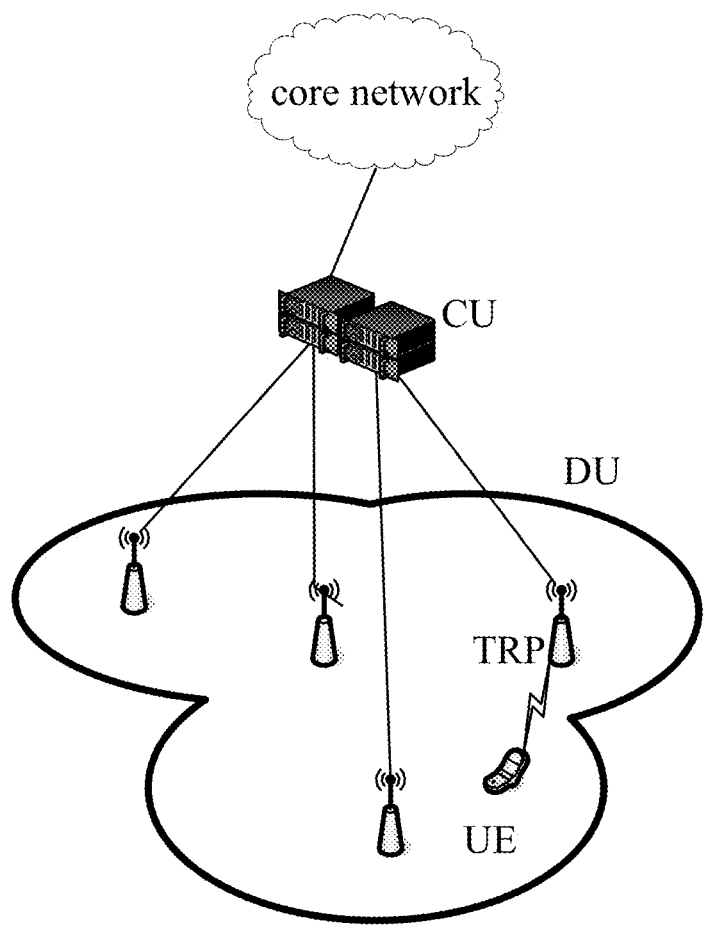
FIG. 3 is a schematic view showing an architecture of a 5G system.

FIG. 3 shows a possible architecture for a future 5G mobile communication system. The network side nodes include a CU and DUs, and a plurality of DUs deployed in a certain region is controlled by one CU. The air-interface transmission is performed between the DUs and the UE via Transmission Reception Points (TRPs). Each UE may be served by one or more TRPs, so as to perform the data transmission.

The scheme in the embodiments of the present disclosure may be applied to the above two types of RAN architecture.

Figure 4:
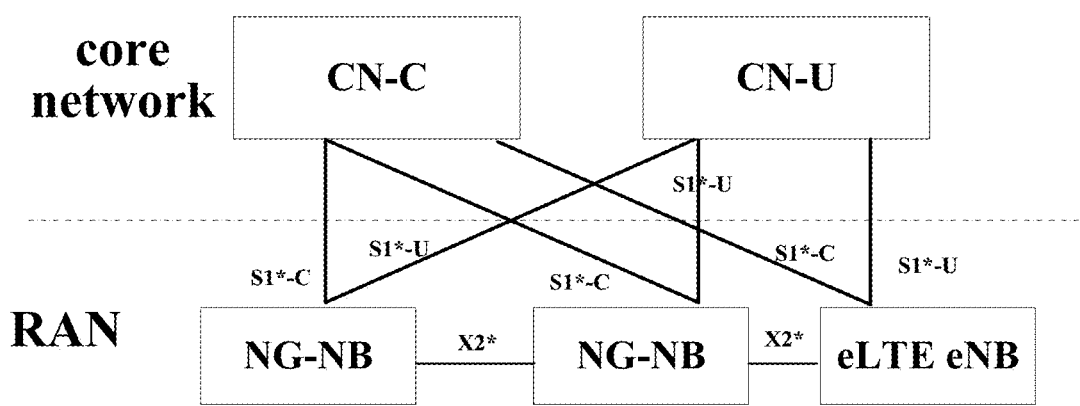
FIG. 4 is a schematic view showing an architecture of a 5G network.

FIG. 4 shows 5G network architecture. The network architecture includes three logic entities, i.e., a CN-C (core network control plane functional entity) at the core network, a CN-U (core network user plane functional entity), and a gNB (a next-generation node B) and an evolved LTE (eLTE) eNB at an access network. An NG-C interface is established between the CN-C and the gNB for the transmission of control plane signaling, and an NG-U interface is established between the CN-U and the gNB for the transmission of user plane data. An Xn interface is established between the gNBs, and the Xn interface may support a control plane function (e.g., Xn-C) and a user plane function (e.g., Xn-C) simultaneously.

A control plane connection with UE as granularity may be established on the NG-C (a control plane connection corresponding to each UE may be identified with an NG-AP Identity (ID)), and a user plane connection (or user plane tunnel) with PDU session as granularity may be established on the NG-U. Each UE may merely maintain the NG-C connection with the CN-C, but a plurality of user plane connections (user plane tunnels) with PDU session as granularity to the CN-U via the NG-U interface may be established simultaneously. In addition, each UE may be served by one or more gNBs in the RAN simultaneously.

There is no such a concept as bearer in a future 5G core network, and the QoS parameter issued by the CN-C to the gNB may be configured with flow as granularity. In addition, the gNB may perform QoS management with RB as granularity, so it is necessary for the RAN to generate a RB-level QoS parameter for the interaction between the gNB and the UE and the interaction between the gNB and the other radio access entity.

The present disclosure provides in some embodiments a QoS processing method which, as shown in FIG. 5, includes Step 501 of transmitting, by a target base station, a first message to a source base station. The first message may at least include first information for notifying the source base station that the target base station is incapable of meeting a QoS requirement on one or more flows of a UE and second information of QoS parameter capable of being accepted by the target base station and recommended with respect to the one or more flows.

For example, during an Xn handover process, the target base station may notify, through a handover response message, the source base station of a flow list including the flows on which the QoS requirement is incapable of being met by the target base station, and the QoS parameter recommended with respect to these flows may also be carried in the handover response message. The source base station may determine a target base station that meets the QoS requirement in accordance with the QoS parameter recommended with respect to these flows.

According to the embodiments of the present disclosure, the QoS parameter capable of being accepted by the target base station and recommended with respect to the one or more flows may be carried in the first message, so that the target base station may notify the source base station of the QoS parameter capable of being accepted by the target base station when the target base station notifies the source base station that the target base station is incapable of meeting the QoS requirement on the one or more flows of the UE. As a result, it is able to prevent the source base station from directly deactivating the bearers incapable of being accepted by the target base station as compared with the related art, thereby to enable the target base station to support a corresponding service.

The present disclosure further provides in some embodiments a QoS processing method which, as shown in FIG. 6, includes the following steps.

Step 601: transmitting, by a target base station, a first message to a source base station, wherein the first message may at least include first information for notifying the source base station that the target base station is incapable of meeting a QoS requirement on one or more flows of a UE and second information of QoS parameter capable of being accepted by the target base station and recommended with respect to the one or more flows.

For example, during an Xn handover process, the target base station may notify, through a handover response message, the source base station of a flow list including the flows on which the QoS requirement is incapable of being met, and the QoS parameter recommended with respect to these flows may also be carried in the handover response message.

Step 602: transmitting, by the target base station, a second message to a core network. The second message may include third information for notifying the core network that the target base station is incapable of meeting the QoS requirement on the one or more flows of the UE.

For example, after the source base station has selected a proper target cell in accordance with the first message acquired in Step 601 and the handover process has been performed, the target base station may notify the core network that an RAN is incapable of meeting the QoS requirement on a certain flow or flows.

In a possible embodiment of the present disclosure, the second message may further include fourth information of the QoS parameter capable of being accepted by the target base station and recommended with respect to the one or more flows.

Referring again to FIG. 6, in a possible embodiment of the present disclosure, the QoS processing method may further include Step 603 of receiving, by the target base station, an updated QoS parameter of the one or more flows transmitted from the core network.

The core network is capable of updating the QoS parameter of the one or more flows in accordance with the QoS parameter in the second message capable of being accepted by the target base station and recommended with respect to the one or more flows.

According to the embodiments of the present disclosure, a processing procedure may be provided when the target base station is incapable of meeting the QoS requirement. The QoS parameter capable of being accepted by the target base station and recommended with respect to the one or more flows may be carried in the first message, so that the target base station may notify the source base station of the QoS parameter capable of being accepted by the target base station when the target base station notifies the source base station that the target base station is incapable of meeting the QoS requirement on the one or more flows of the UE. As a result, it is able to prevent the source base station from directly deactivating the bearers incapable of being accepted by the target base station as compared with the related art, thereby to enable the target base station to support a corresponding service.

It should be appreciated that, the processes shown in FIGS. 5 and 6 may be applied to, but not limited to, a handover scenario.

Figure 7:
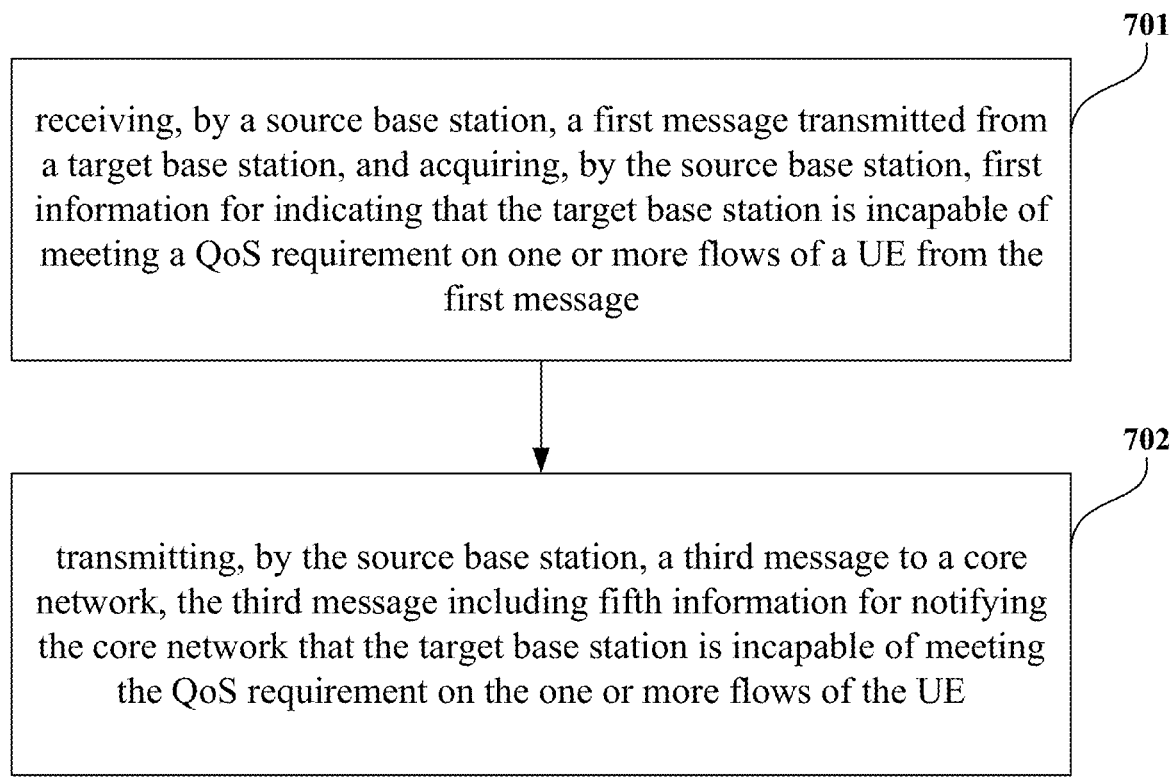
FIG. 7 is a flow chart of a QoS processing method according to an embodiment of the present disclosure.

The present disclosure further provides in some embodiments a QoS processing method which, as shown in FIG. 7, includes the following steps.

Step 701: receiving, by a source base station, a first message transmitted from a target base station, and acquiring, by the source base station, first information for indicating that the target base station is incapable of meeting a QoS requirement on one or more flows of a UE from the first message. The first message may further include second information of QoS parameter capable of being accepted by the target base station and recommended with respect to the one or more flows.

For example, during an Xn handover process, the target base station may notify, through a handover response message, the source base station of a flow list including the flows on which the QoS requirement is incapable of being met by the target base station, and the QoS parameter recommended with respect to these flows may also be carried in the handover response message.

Step 702: transmitting, by the source base station, a third message to a core network. The third message may include fifth information for notifying the core network that the target base station is incapable of meeting the QoS requirement on the one or more flows of the UE.

In a possible embodiment of the present disclosure, the third message may further include sixth information of the QoS parameter capable of being accepted by the target base station and recommended with respect to the one or more flows.

According to the embodiments of the present disclosure, a processing procedure may be provided when the target base station is incapable of meeting the QoS requirement. The QoS parameter capable of being accepted by the target base station and recommended with respect to the one or more flows may be carried in the first message, so that the target base station may notify the source base station of the QoS parameter capable of being accepted by the target base station when notifying the source base station that the target base station is incapable of meeting the QoS requirement on the one or more flows of the UE. As a result, it is able to prevent the source base station from directly deactivating the bearers incapable of being accepted by the target base station as compared with the related art, thereby to enable the target base station to support a corresponding service.

Figure 8:
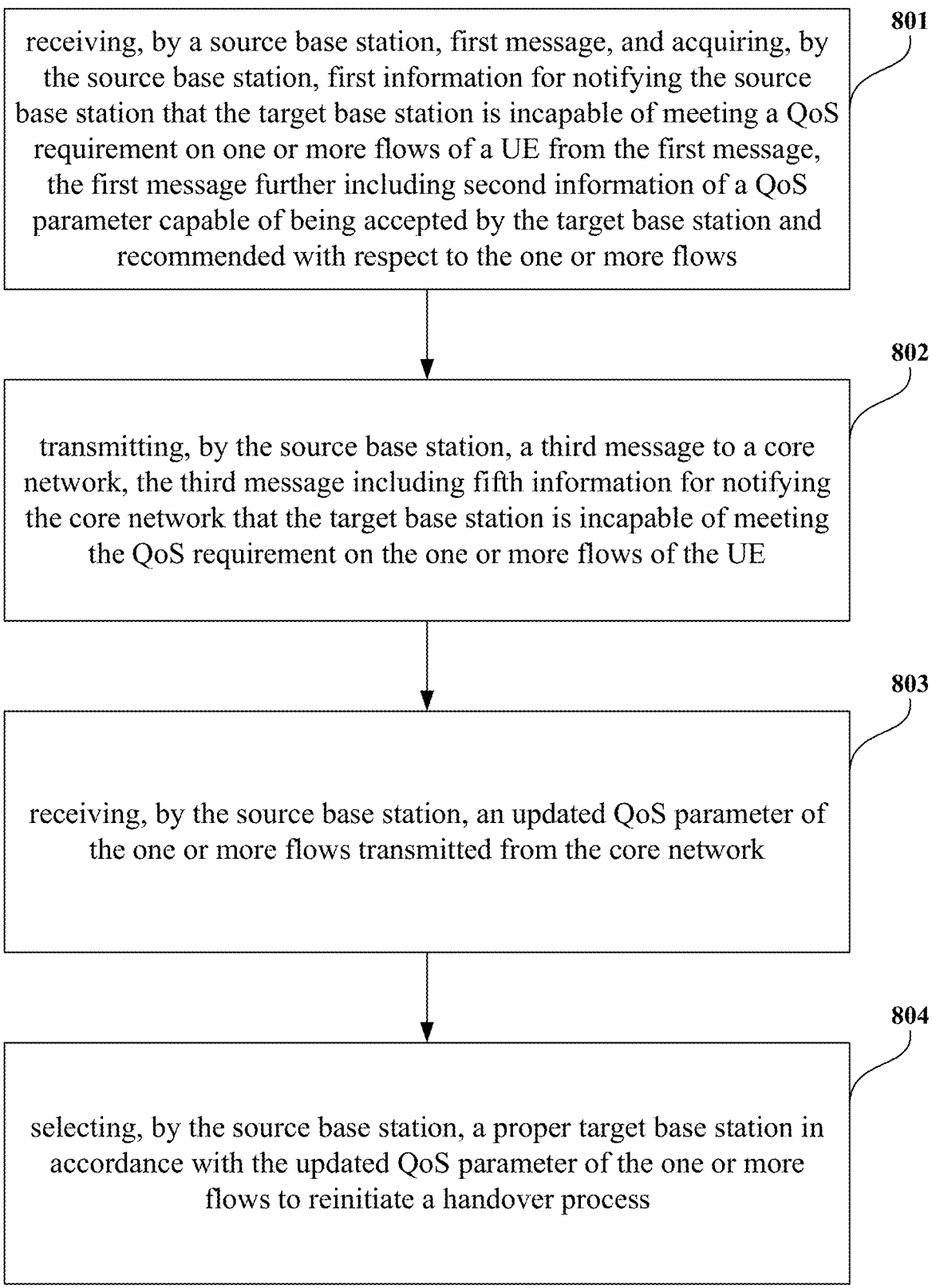
FIG. 8 is a flow chart of the QoS processing method according to another embodiment of the present disclosure.

The present disclosure further provides in some embodiments a QoS processing method which, as shown in FIG. 8, includes the following steps.

Step 801: receiving, by a source base station, a first message, and acquiring, by the source base station, first information for notifying the source base station that the target base station is incapable of meeting a QoS requirement on one or more flows of a UE from the first message. The first message may further include a second information of QoS parameter capable of being accepted by the target base station and recommended with respect to the one or more flows.

For example, during an Xn handover process, the target base station may notify, through a handover response message, the source base station of a flow list including the flows on which the QoS requirement is incapable of being met by the target base station, and the QoS parameter recommended with respect to these flows may also be carried in the handover response message.

Step 802: transmitting, by the source base station, a third message to a core network. The third message may include fifth information for notifying the core network that the target base station is incapable of meeting the QoS requirement on the one or more flows of the UE. In a possible embodiment of the present disclosure, the third message may further include sixth information of the QoS parameter capable of being accepted by the target base station and recommended with respect to the one or more flows.

Step 803: receiving, by the source base station, an updated QoS parameter of the one or more flows transmitted from the core network.

Step 804: selecting, by the source base station, a proper target base station in accordance with the updated QoS parameter of the one or more flows to reinitiate a handover process.

According to the embodiments of the present disclosure, a processing procedure may be provided when the target base station is incapable of meeting the QoS requirement. The QoS parameter capable of being accepted by the target base station and recommended with respect to the one or more flows may be carried in the first message, so that the target base station may notify the source base station of the QoS parameter capable of being accepted by the target base station when notifying the source base station that the target base station is incapable of meeting the QoS requirement on the one or more flows of the UE. As a result, it is able to prevent the source base station from directly deactivating the bearers incapable of being accepted by the target base station as compared with the related art, thereby to enable the target base station to support a corresponding service.

In addition, the source base station may further select a proper target base station in accordance with the updated QoS parameter of the one or more flows to reinitiate a handover process, so as to improve the entire handover procedure, thereby to enable the QoS requirement on the one or more flows of the UE to be accepted by the target base station.

It should be appreciated that, the processes shown in FIGS. 5 and 6 may be applied to, but not limited to, a handover scenario.

Figure 9:
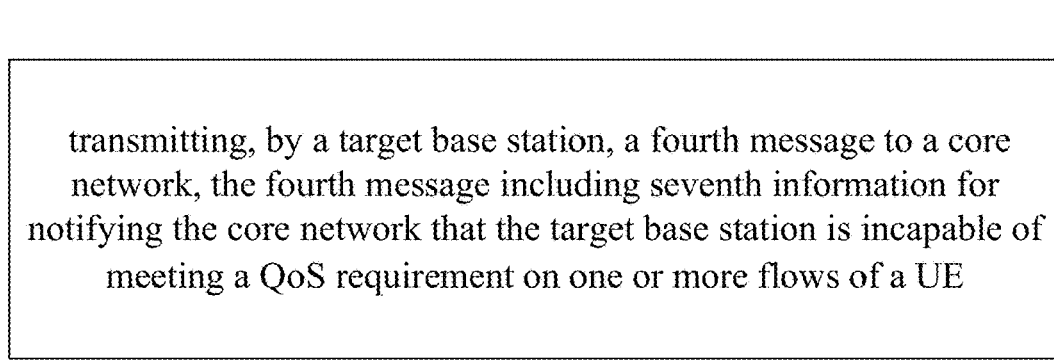
FIG. 9 is a flow chart of a QoS processing method according to an embodiment of the present disclosure.

The present disclosure further provides in some embodiments a QoS processing method which, as shown in FIG. 9, includes Step 901 of transmitting, by a target base station, a fourth message to a core network. The fourth message may include seventh information for notifying the core network that the target base station is incapable of meeting a QoS requirement on one or more flows of a UE.

In a possible embodiment of the present disclosure, the fourth message may further include eighth information of QoS parameter capable of being accepted by the target base station and recommended with respect to the one or more flows.

In a possible embodiment of the present disclosure, subsequent to Step 901, the QoS processing method may further include receiving, by the target base station, an updated QoS parameter of the one or more flows transmitted from the core network.

In a possible embodiment of the present disclosure, upon the receipt of the updated QoS parameter of the one or more flows by the target base station, the target base station may transmit a handover response message to the core network. The core network may transmit a handover response message carrying the updated QoS parameter to the source base station. Then the source base station may transmit a handover command to the UE, and then the UE may access to a target cell.

It should be appreciated that, the QoS processes shown in FIG. 9 may be applied to a handover scenario or a PDU session establishment scenario.

In the PDU session establishment scenario, the target base station may also be called as a serving base station for the UE. When the serving base station for the UE is incapable of meeting the QoS requirement on the one or more flows for a PDU session, the serving base station may also notify, via a message, the core network that it is incapable of meeting the QoS requirement on the one or more flows of the UE.

Figure 10:
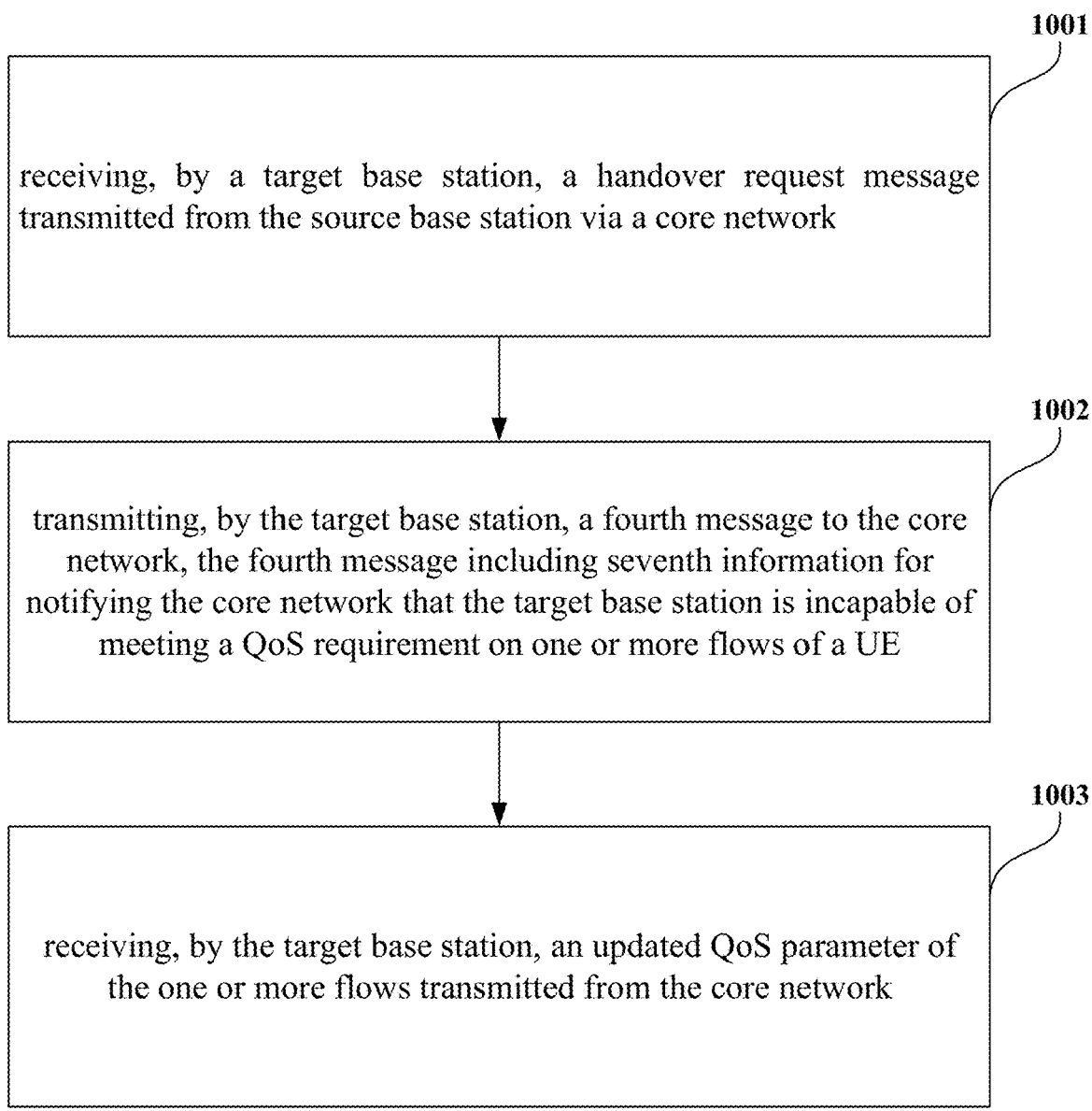
FIG. 10 is a flow chart of the QoS processing method according to another embodiment of the present disclosure.

The present disclosure further provides in some embodiments a QoS processing method which, as shown in FIG. 10, includes the following steps.

Step 1001: receiving, by a target base station, a handover request message transmitted from the source base station via a core network.

Step 1002: transmitting, by the target base station, a fourth message to the core network. The fourth message may include seventh information for notifying the core network that the target base station is incapable of meeting a QoS requirement on one or more flows of a UE.

In a possible embodiment of the present disclosure, the fourth message may further include eighth information of QoS parameter capable of being accepted by the target base station and recommended with respect to the one or more flows.

Step 1003: receiving, by the target base station, an updated QoS parameter of the one or more flows transmitted from the core network.

According to the embodiments of the present disclosure, a processing procedure may be provided when the target base station is incapable of meeting the QoS requirement. The QoS parameter capable of being accepted by the target base station and recommended with respect to the one or more flows may be carried in the fourth message, so that the target base station may notify the core network of the QoS parameter capable of being accepted by the target base station and the target base station is capable of accepting the updated QoS parameter of the one or more flows transmitted by the core network when the target base station is incapable of meeting the QoS requirement on the one or more flows of the UE. As a result, it is able to prevent the source base station from directly deactivating the bearers incapable of being accepted by the target base station as compared with the related art, thereby to enable the target base station to support a corresponding service.

In addition, the source base station may further select a proper target base station in accordance with the updated QoS parameter of the one or more flows to reinitiate a handover process, so as to improve the entire handover procedure, thereby to enable the QoS requirement on the one or more flows of the UE to be accepted by the target base station.

The present disclosure further provides in some embodiments a QoS processing method which, as shown in FIG. 11, include Step 1101 of receiving, by a core network, a fourth message transmitted from a target base station, and acquiring, by the core network, the seventh message from the fourth message, wherein the seventh information is configured for notifying the core network that the target base station is incapable of meeting a QoS requirement on one or more flows of a UE.

In a possible embodiment of the present disclosure, the fourth message may further include eighth information of a QoS parameter capable of being accepted by the target base station and recommended with respect to the one or more flows.

According to the embodiments of the present disclosure, a processing procedure may be provided when the target base station is incapable of meeting the QoS requirement. The QoS parameter capable of being accepted by the target base station and recommended with respect to the one or more flows may be carried in the fourth message, so that the target base station may notify the core network of the QoS parameter capable of being accepted by the target base station when the target base station is incapable of meeting the QoS requirement on the one or more flows of the UE.

Figure 12:
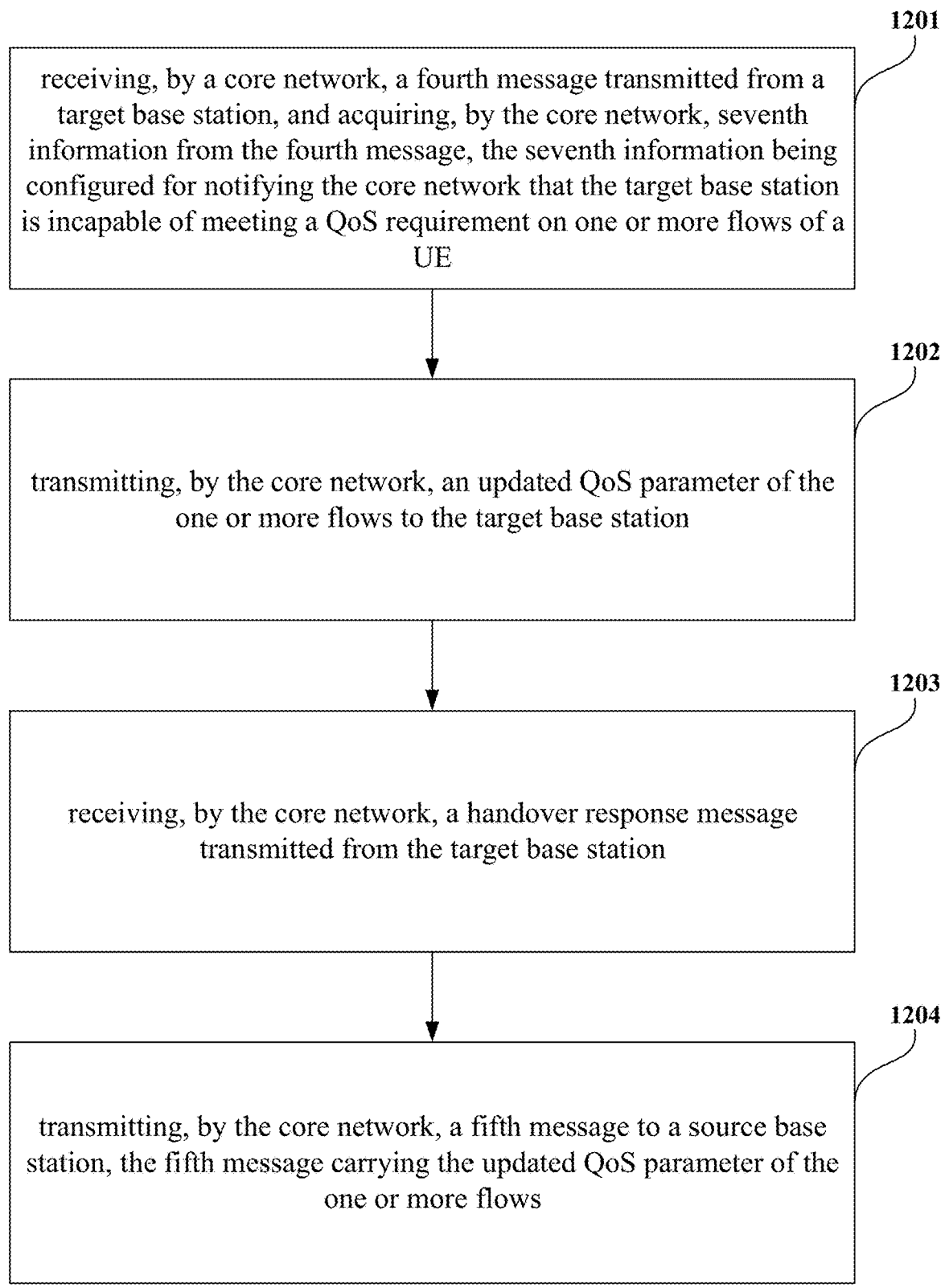
FIG. 12 is a flow chart of the QoS processing method according to another embodiment of the present disclosure.

The present disclosure further provides in some embodiments a QoS processing method which, as shown in FIG. 12, includes the following steps.

Step 1201: receiving, by a core network, a fourth message transmitted from a target base station, and acquiring, by the core network, seventh information from the fourth message, wherein the seventh information is configured for notifying the core network that the target base station is incapable of meeting a QoS requirement on one or more flows of a UE.

In a possible embodiment of the present disclosure, the fourth message may further include eighth information of QoS parameter capable of being accepted by the target base station and recommended with respect to the one or more flows.

Step 1202: transmitting, by the core network, an updated QoS parameter of the one or more flows to the target base station.

Step 1203: receiving, by the core network, a handover response message transmitted from the target base station.

Step 1204: transmitting, by the core network, a fifth message to a source base station. The fifth message may carry the updated QoS parameter of the one or more flows.

Upon the receipt of the updated QoS parameter of the one or more flows, the source base station may transmit a handover command, and then the UE may access to a target cell.

It should be appreciated that, the procedures in FIGS. 11 and 12 may be adapted to an NG handover process. In other words, in the NG handover process, the target base station may notify the core network that the QoS requirement on the QoS parameter of the one or more flows is incapable of being met. In addition, the target base station may also provide the recommended QoS parameter.

According to the embodiments of the present disclosure, a processing procedure may be provided when the target base station is incapable of meeting the QoS requirement. The QoS parameter capable of being accepted by the target base station and recommended with respect to the one or more flows may be carried in the fourth message, so that the target base station may notify the core network of the QoS parameter capable of being accepted by the target base station when the target base station is incapable of meeting the QoS requirement on the one or more flows of the UE.

In some embodiments of the present disclosure, in an Xn handover process, when the target base station determines that it is incapable of meeting the QoS requirement on some flows of the UE in accordance with its own condition, e.g., load, the target base station may transmit an instruction to the source base station. Meanwhile, the target base station may also carries the recommended QoS parameter of the flow. The source base station may determine a final target cell in accordance with the above-mentioned information. After the handover, the target base station may notify the core network that the QoS requirement on the flows of the UE is incapable of being met. In addition, the target base station may also carries the QoS parameter of the flows. Then, the core network may update the QoS parameter of the flow in accordance with the above-mentioned information, and issue the QoS parameter to the target base station.

Figure 13:
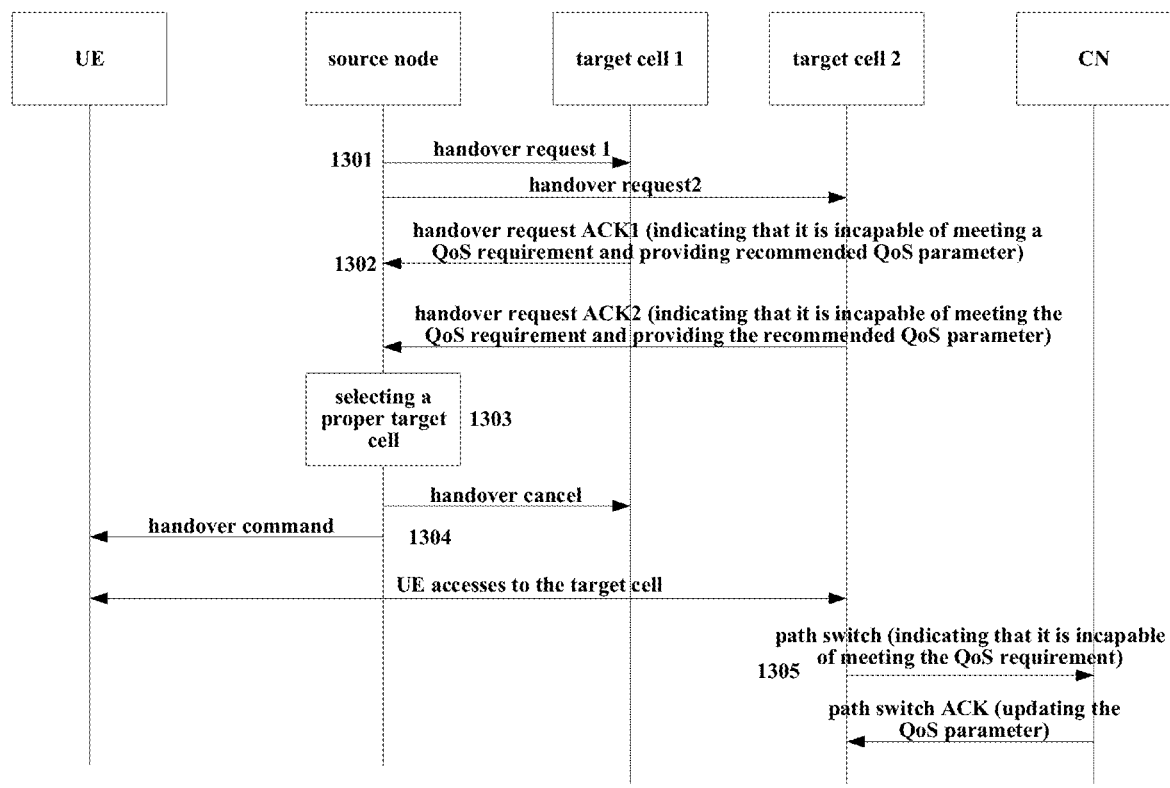
FIG. 13 is a schematic view showing an Xn handover procedure in which it, after the handover, notifies a core network (Radio Access Network (RAN)) that it is incapable of meeting a QoS requirement on some flows according to an embodiment of the present disclosure.

To be specific, FIG. 13 shows the Xn handover process in which it, after the handover, notifies the core network (RAN) that it is incapable of meeting the QoS requirement on some flows.

Step 1301: the source base station (source node) may transmit a handover request message to a plurality of target base stations (target cell 1 and target cell 2).

Step 1302: the target base station may perform acceptance control in accordance with the QoS parameter of the flow, and return information of the flow that has been accepted successfully, information of the flow that is incapable of meeting the QoS requirement (merely the flow for notification control), and information of the flow that has been accepted unsuccessfully through handover request messages (handover request Acknowledgement (ACK) 1 and handover request ACK 2).

With respect to the flow for notification control, when the target base station is incapable of meeting the QoS requirement on the flow, a corresponding instruction and the recommended QoS parameter capable of being accepted by the current base station (target cell 1 or target cell 2) may be carried in the response message.

Step 1303: the source base station may select a final target cell (select the proper target cell) in accordance with the received response message, and transmit a handover cancel message to the other target cell.

Step 1304: the source base station may transmit a handover command to the UE, and the UE may access to the target cell.

Step 1305: the target base station may indicate, in a path switching message to the core network, the core network that the target base station is incapable of meeting the QoS requirement on some flows, and the core network may update the QoS parameter and notify the target base station of the updated QoS parameter through a path switching ACK message.

In some embodiments, in the Xn handover process, when the target base station determines that it is incapable of meeting the QoS requirement on some flows of the UE in accordance with its own condition, e.g., load, the target base station may transmit an instruction to the source base station. Meanwhile, the target base station may also carry the QoS parameter of the flow capable of being accepted by the target base station. Upon the receipt of the instruction, the source base station may notify the core network, and then the core network may transmit the updated QoS parameter of the flow to the source base station. The source base station may select the target cell in accordance with the information from the target base station, so as to reinitiate the handover process for the target base station.

Figure 14:
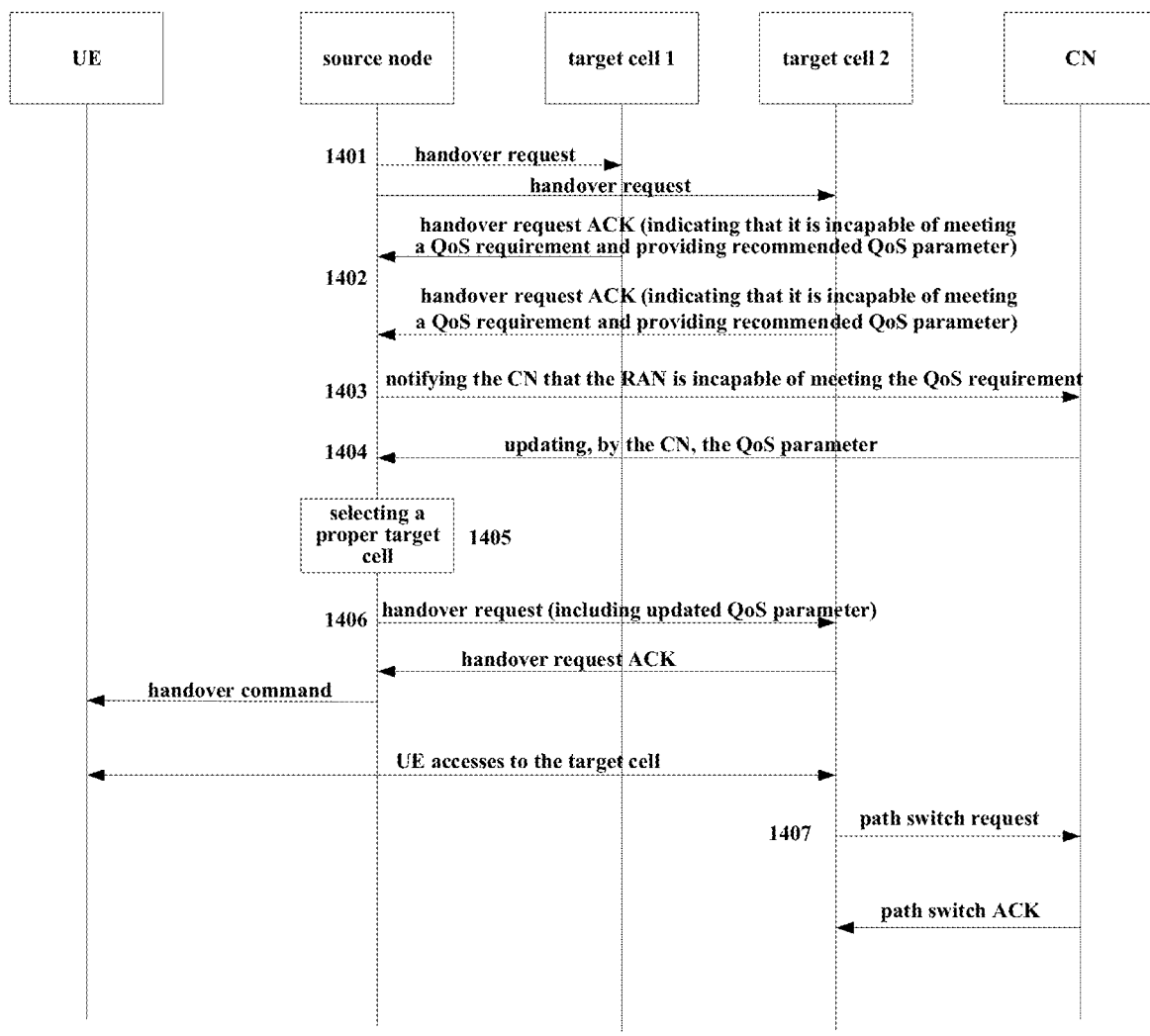
FIG. 14 is a schematic view showing an Xn handover procedure in which it, before the handover, notifies the core network (the RAN) that it is incapable of meeting the QoS requirement on some flows according to an embodiment of the present disclosure.

To be specific, FIG. 14 shows the Xn handover procedure in which it, before the handover, notifies the core network (the RAN) that it is incapable of meeting the QoS requirement on some flows.

Step 1401: the source base station (source node) may transmit a handover request message to a plurality of target base stations (target cell 1 and target cell 2).

Step 1402: the target base station may perform acceptance control in accordance with the QoS parameter of the flow, and return information of the flow that have been accepted successfully, information of the flow that is incapable of meeting the QoS requirement (merely the flow for notification control), and information of the flow that has been accepted unsuccessfully through a handover request response message (handover request ACK). With respect to the flow for notification control, when the target base station is incapable of meeting the QoS requirement on the flow, a corresponding instruction and the recommended QoS parameter capable of being accepted by the current base station may be carried in the response message.

Step 1403: the source base station may transmit an instruction indicating that the RAN is incapable of meeting the QoS requirement to the core network.

Step 1404: the core network may update the QoS parameter for the UE and transmit the updated QoS parameter to the base station.

Step 1405: the source base station may select a proper target cell so as to initiate the handover process, and the updated QoS parameter may be carried in the handover request message.

Step 1406: the source base station may transmit a handover command to the UE, and the UE may access to the target cell.

Step 1407: the target base station may initiate a path switching process to the core network.

Figure 15:
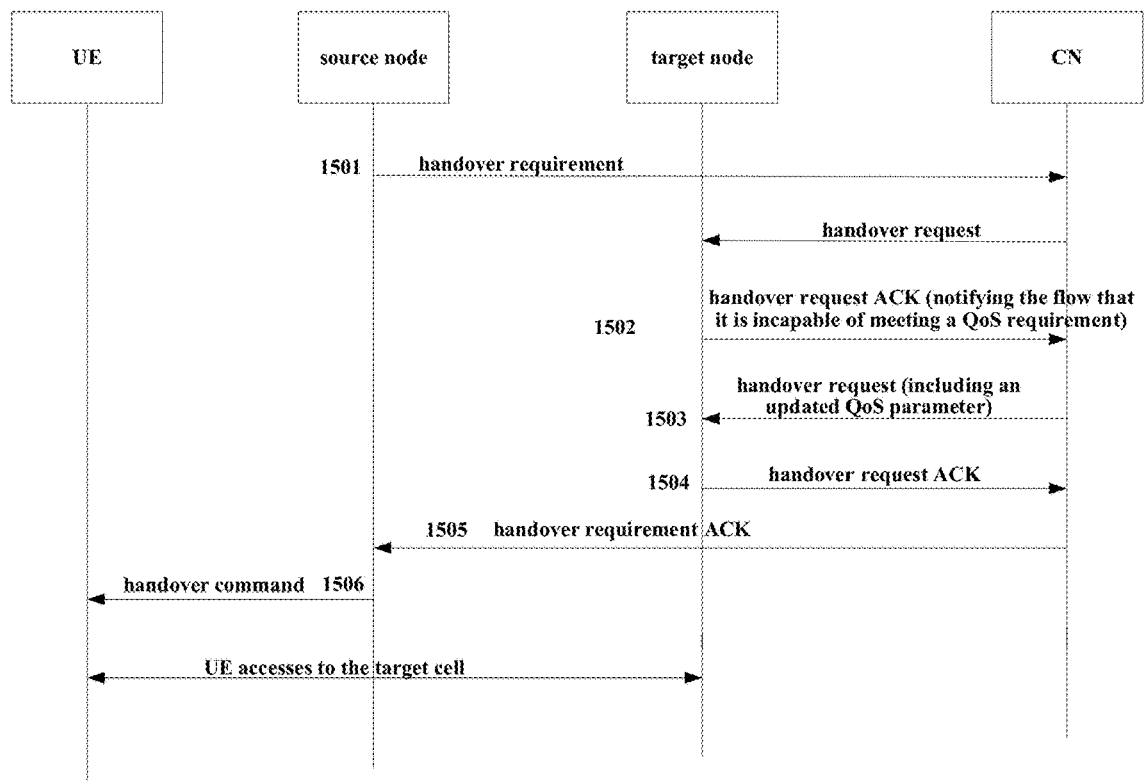
FIG. 15 is a schematic view showing an NG handover process according to an embodiment of the present disclosure.

In some embodiments of the present disclosure, in the NG handover process, when the target base station determines, upon the receipt of the handover request from the core network, that it is incapable of meeting the QoS requirement on some flows of the UE in accordance with its own condition, e.g., load, the target base station may transmit an instruction to the core network. Meanwhile, the target base station may also carries the QoS parameter of the flow recommended by the target base station. The core network may adjust the QoS parameter of the flow and transmit the updated QoS parameter to the source base station and the target base station. The source base station may transmit a handover command carrying the updated QoS parameter to the UE, as shown in FIG. 15.

Step 1501: the source base station may transit a handover request message to the target base station via the core network (CN).

Step 1502: the target base station may notify the CN that the RAN is incapable of meeting the QoS requirement on some flows.

Step 1503: the core network may transmit updated QoS parameter to the target base station.

Step 1504: the target base station may transmit a handover request ACK message to the core network.

Step 1505: the core network may transmit a handover response message carrying the updated QoS parameter to the source base station.

Step 1506: the source base station may transmit a handover command to the UE, and the UE may access to a target cell.

Based on a same inventive concept, the present disclosure further provides in some embodiments a QoS processing device. A principle of the QoS processing device for solving the problem is similar to that mentioned in the QoS processing method in FIGS. 5 and 6, so the implementation of the QoS processing device may refer to that of the QoS processing method, which will not be particularly defined herein.

Figure 16:
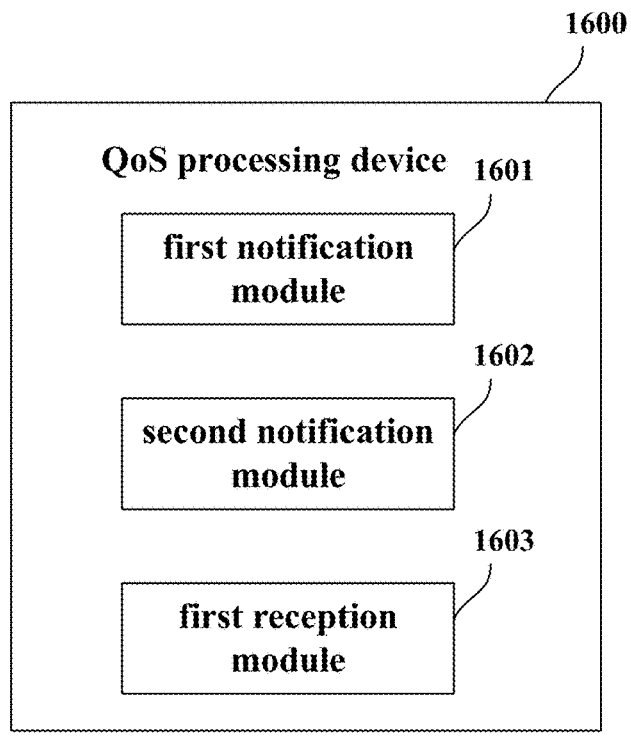
FIG. 16 is a schematic view showing a QoS processing device according to an embodiment of the present disclosure.

The present disclosure further provides in some embodiments a QoS processing device 1600 for a target base station. As shown in FIG. 16, the QoS processing device 1600 includes a first notification module 1601 configured to notify, through a first message, a source base station that the target base station is incapable of meeting a QoS requirement on one or more flows of a UE, and the first message further includes that a QoS parameter capable of being accepted by the target base station and recommended with respect to the one or more flows.

In a possible embodiment of the present disclosure, the QoS processing device 1600 may further include a second notification module 1602 configured to notify, through a second message, the core network that the target base station is incapable of meeting the QoS requirement on the one or more flows of the UE.

In a possible embodiment of the present disclosure, the second message may further include the QoS parameter capable of being accepted by the target base station and recommended with respect to the one or more flows.

In a possible embodiment of the present disclosure, the QoS processing device 1600 may further include a first reception module 1603 configured to receive an updated QoS parameter of the one or more flows transmitted from the core network.

Based on a same inventive concept, the present disclosure further provides in some embodiments a QoS processing device. A principle of the QoS processing device for solving the problem is similar to that mentioned in the QoS processing method in FIGS. 7 and 8, so the implementation of the QoS processing device may refer to that of the QoS processing method, which will not be particularly defined herein.

Figure 17:
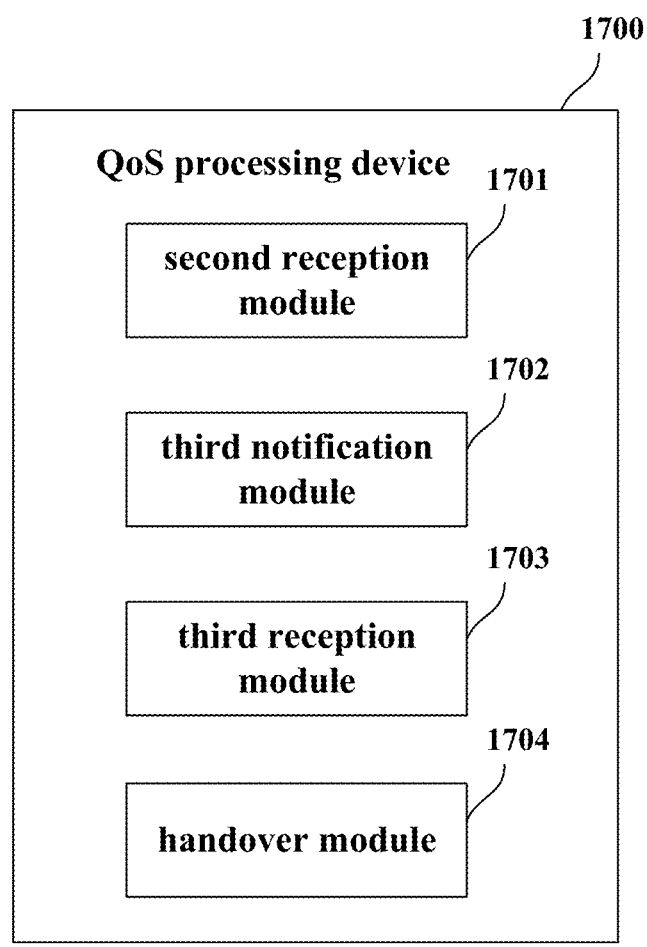
FIG. 17 is a schematic view showing a QoS processing device according to another embodiment of the present disclosure.

The present disclosure further provides in some embodiments a QoS processing device for a source base station. As shown in FIG. 17, the QoS processing device 1700 includes: a second reception module 1701 configured to determine, through a first message, that a target base station is incapable of meeting a QoS requirement on one or more flows of a UE; and a third notification module 1702 configured to notify, through a third message, a core network that the target base station is incapable of meeting the QoS requirement on the one or more flows of the UE. The first message may further include QoS parameter capable of being accepted by the target base station and recommended with respect to the one or more flows.

In a possible embodiment of the present disclosure, the third message may further the QoS parameter capable of being accepted by the target base station and recommended with respect to the one or more flows.

In a possible embodiment of the present disclosure, the QoS processing device 1700 may further includes: a third reception module 1703 configured to receive an updated QoS parameter of the one or more flows transmitted from the core network; and a handover module 1704 configured to select a proper target base station in accordance with the updated QoS parameter of the one or more flows to reinitiate a handover process.

Based on a same inventive concept, the present disclosure further provides in some embodiments a QoS processing device. A principle of the QoS processing device for solving the problem is similar to that mentioned in the QoS processing method in FIGS. 9 and 10, so the implementation of the QoS processing device may refer to that of the QoS processing method, which will not be particularly defined herein.

Figure 18:
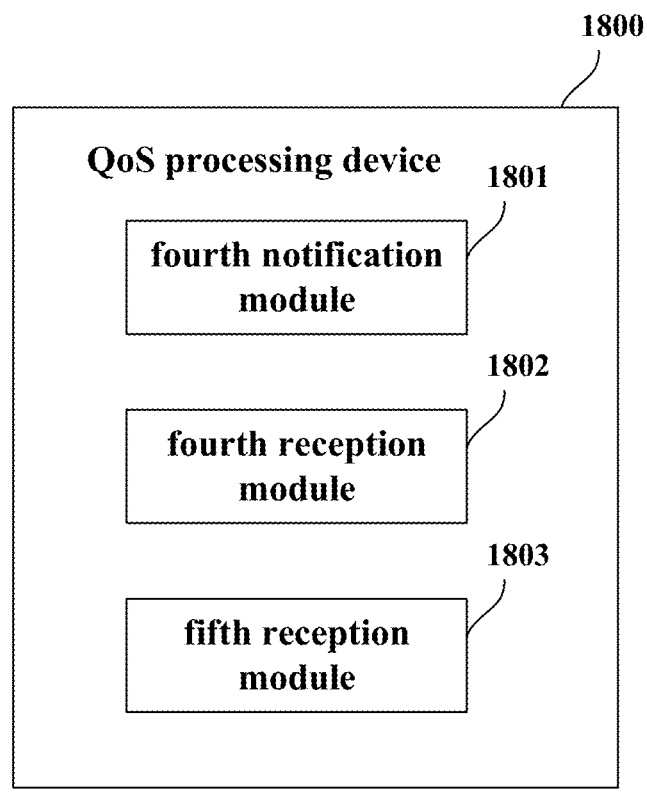
FIG. 18 is a schematic view showing a QoS processing device according to yet another embodiment of the present disclosure.

The present disclosure further provides in some embodiments a QoS processing device 1800 for a target base station. As shown in FIG. 18, the QoS processing device 1800 includes a fourth notification module 1801 configured to notify, through a fourth message, a core network that the target base station is incapable of meeting a QoS requirement on one or more flows of a UE.

In a possible embodiment of the present disclosure, the fourth message may further include QoS parameter capable of being accepted by the target base station and recommended with respect to the one or more flows.

In a possible embodiment of the present disclosure, the QoS processing device 1800 may further include a fourth reception module 1802 configured to receive an updated QoS parameter of the one or more flows transmitted from the core network.

In a possible embodiment of the present disclosure, the QoS processing device 1800 may further include a fifth reception module 1803 configured to receive a handover request message transmitted from a source base station via the core network.

Based on a same inventive concept, the present disclosure further provides in some embodiments a QoS processing device. A principle of the QoS processing device for solving the problem is similar to that mentioned in the QoS processing method in FIGS. 11 and 12, so the implementation of the QoS processing device may refer to that of the QoS processing method, which will not be particularly defined herein.

Figure 19:
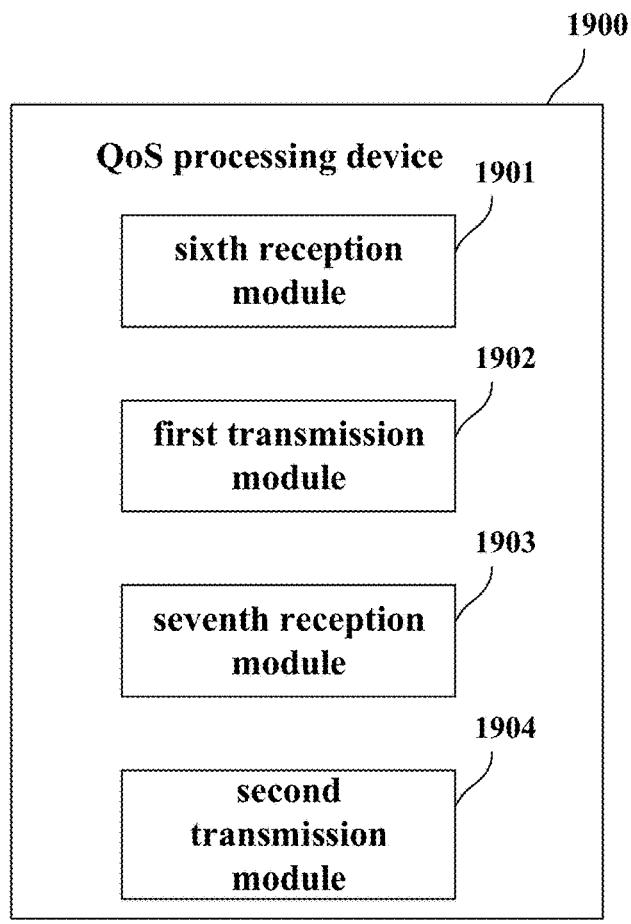
FIG. 19 is a schematic view showing a QoS processing device according to yet another embodiment of the present disclosure.

The present disclosure further provides in some embodiments a QoS processing device 1900 for a core network. As shown in FIG. 19, the QoS processing device 1900 includes a sixth reception module 1901 configured to receive a fourth message transmitted from a target base station, so as to determine, through the fourth message, that the target base station is incapable of meeting a QoS requirement on one or more flows of a UE.

In a possible embodiment of the present disclosure, the fourth message may further include a QoS parameter capable of being accepted by the target base station and recommended with respect to the one or more flows.

In a possible embodiment of the present disclosure, the QoS processing device may further include: a first transmission module 1902 configured to transmit an updated QoS parameter of the one or more flows to the target base station; and a seventh reception module 1903 configured to receive a handover response message transmitted from the target base station.

In a possible embodiment of the present disclosure, the QoS processing device may further include a second transmission module 1904 configured to transmit a fifth message to a source base station, the fifth message carries the update QoS parameter of the one or more flows.

Figure 20:
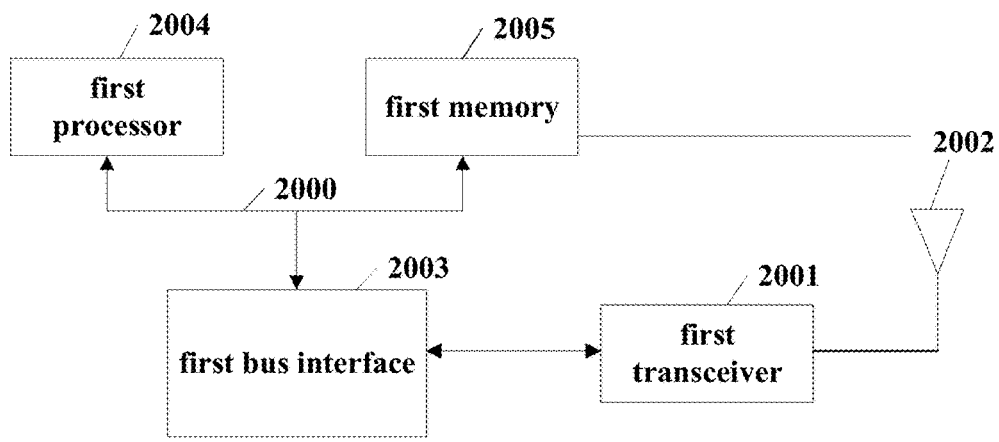
FIG. 20 is a schematic view showing a target base station according to an embodiment of the present disclosure.

The present disclosure further provides in some embodiments a target base station which, as shown in FIG. 20, includes a first processor 2004, a first transceiver 2001 and a first memory 2005. The first processor 2004 is configured to read a program stored in the first memory 2005, so as to transmit a first message to a source base station. The first message may at least include first information for notifying the source base station that the target base station is incapable of meeting a QoS requirement on one or more flows of a UE and second information of QoS parameter capable of being accepted by the target base station and recommended with respect to the one or more flows. The first transceiver 2001 is configured to receive and transmit data under the control of the first processor 2004.

In FIG. 20, the bus architecture (represented by a first bus 2000) may include a number of buses and bridges connected to each other, the first bus 2000 connects various circuits for one or more processors such as the first processor 2004 and one or more memories such as the first memory 2005. In addition, the first bus 2000 may also be used to connect various other circuits, such as a circuit for a peripheral device, a circuit for a voltage stabilizer and a power management circuit. A first bus interface 2003 may be provided between the first bus 2000 and the first transceiver 2001, and the first transceiver 2001 may consist of one element, or more than one element, e.g., a transmitter and a receiver for communication with various other devices over a transmission medium. Data processed by the first processor 2004 may be transmitted on a wireless medium via the first transceiver 2001 and a first antenna 2002. Further, the first antenna 2002 may further receive data and transmit the data to the first processor 2004 via the first transceiver 2001.

The first processor 2004 may take charge of managing the first bus 2000 as well as general processings, and may further provide various functions such as timing, peripheral interfacing, voltage adjustment, power source management and other control functions. The first memory 2005 may store therein data for the operation of the first processor 2004. To be specific, the first processor 2104 may be a Central Processing Unit (CPU), an Application Specific Integrated Circuit (ASIC), a Field-Programmable Gate Array (FPGA) or a Complex Programmable Logic Device (CPLD).

In a possible embodiment of the present disclosure, the first processor is further configured to transmit a second message to a core network, and the second message may include third information for notifying the core network that the target base station is incapable of meeting the QoS requirement on the one or more flows of the UE.

In a possible embodiment of the present disclosure, the second message may further include fourth information of the QoS parameter capable of being accepted by the target base station and recommended with respect to the one or more flows.

In a possible embodiment of the present disclosure, the first processor 2004 is further configured to receive an updated QoS parameter of the one or more flows transmitted from the core network.

Figure 21:
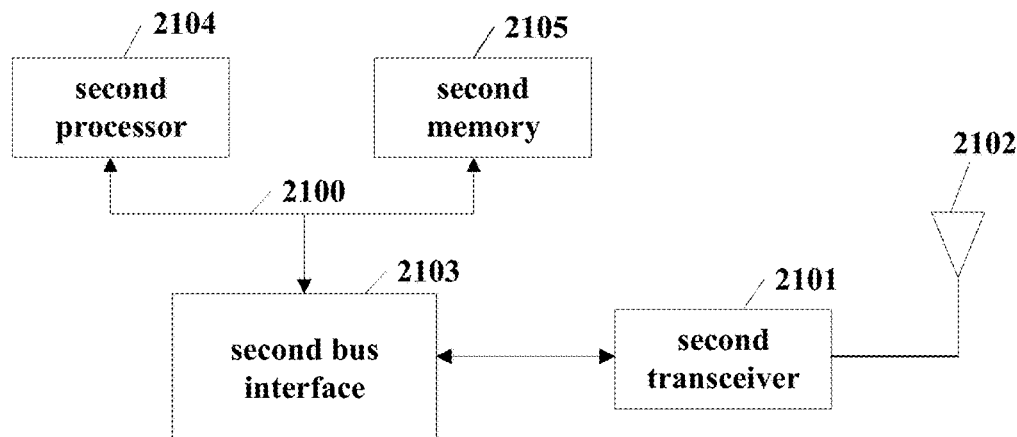
FIG. 21 is a schematic view showing a source base station according to an embodiment of the present disclosure.

The present disclosure further provides in some embodiments a source base station which, as shown in FIG. 21, includes a second processor 2104, a second transceiver 2101 and a second memory 2105. The second processor 2104 is configured to read a program stored in the second memory 2105, so as to: receive a first message transmitted from a target base station, and acquire first information for notifying the source base station that the target base station is incapable of meeting a QoS requirement on one or more flows of a UE from the first message; and transmit a third message to a core network. The third message may include fifth information for notifying the core network that the target base station is incapable of meeting the QoS requirement on the one or more flows of the UE. The first message may further include second information of the QoS parameter capable of being accepted by the target base station and recommended with respect to the one or more flows. The second transceiver 2101 is configured to receive and transmit data under the control of the second processor 2104.

In FIG. 21, bus architecture (represented by a second bus 2100) may include a number of buses and bridges connected to each other, the second bus 2100 connects various circuits for one or more processors such as the second processor 2104 and one or more memories such as the second memory 2105. In addition, the second bus 2100 may also be used to connect various other circuits, such as a circuit for a peripheral device, a circuit for a voltage stabilizer and a power management circuit. A second bus interface 2103 may be provided between the second bus 2100 and the second transceiver 2101, and the second transceiver 2101 may consist of one element, or more than one element, e.g., a transmitter and a receiver for communication with various other devices over a transmission medium. Data processed by the second processor 2104 may be transmitted on a wireless medium via the second transceiver 2101 and a second antenna 2102. Further, the second antenna 2102 may further receive data and transmit the data to the second processor 2104 via the second transceiver 2101.

The second processor 2104 may take charge of managing the second bus 2100 as well as general processings, and may further provide various functions such as timing, peripheral interfacing, voltage adjustment, power source management and other control functions. The second memory 2105 may store therein data for the operation of the second processor 2104. To be specific, the second processor 2104 may be a CPU, an ASIC, an FPGA or a CPLD.

In a possible embodiment of the present disclosure, the third message may further include sixth information of the QoS parameter capable of being accepted by the target base station and recommended with respect to the one or more flows.

In a possible embodiment of the present disclosure, the second processor 2104 is further configured to: receive an updated QoS parameter of the one or more flows transmitted from the core network; and select a proper target base station in accordance with the updated QoS parameter of the one or more flows to reinitiate a handover process.

Figure 22:
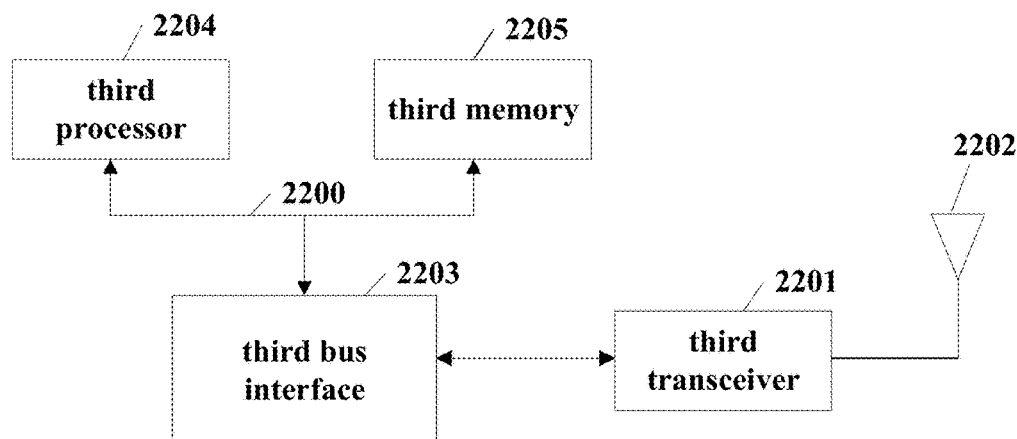
FIG. 22 is a schematic view showing the target base station according to another embodiment of the present disclosure.

The present disclosure further provides in some embodiments a target base station which, as shown in FIG. 22, includes a third processor 2204, a third transceiver 2201 and a third memory 2205. The third processor 2204 is configured to read a program stored in the third memory 2205, so as to transmit a fourth message to a core network. The fourth message may include seventh information for notifying the core network that the target base station is incapable of meeting a QoS requirement on one or more flows of a UE. The third transceiver 2201 is configured to receive and transmit data under the control of the third processor 2204.

In FIG. 22, bus architecture (represented by a third bus 2200) may include a number of buses and bridges connected to each other, the third bus 2200 connects various circuits for one or more processors such as the third processor 2204 and one or more memories such as the third memory 2205. In addition, the third bus 2200 may also be used to connect various other circuits, such as a circuit for a peripheral device, a circuit for a voltage stabilizer and a power management circuit. A third bus interface 2203 may be provided between the third bus 2200 and the third transceiver 2201, and the third transceiver 2201 may consist of one element, or more than one element, e.g., a transmitter and a receiver for communication with various other devices over a transmission medium. Data processed by the third processor 2204 may be transmitted on a wireless medium via the third transceiver 2201 and a third antenna 2202. Further, the third antenna 2202 may further receive data and transmit the data to the third processor 2204 via the third transceiver 2201.

The third processor 2204 may take charge of managing the third bus 2200 as well as general processings, and may further provide various functions such as timing, peripheral interfacing, voltage adjustment, power source management and any other control functions. The third memory 2205 may store therein data for the operation of the third processor 2204. To be specific, the third processor 2204 may be a CPU, an ASIC, an FPGA or a CPLD.

In a possible embodiment of the present disclosure, the fourth message may further include eighth information of QoS parameter capable of being accepted by the target base station and recommended with respect to the one or more flows.

In a possible embodiment of the present disclosure, the third processor 2204 is further configured to receive an updated QoS parameter of the one or more flows transmitted from the core network.

In a possible embodiment of the present disclosure, the third processor 2204 is further configured to receive a handover request message transmitted from a source base station via the core network.

Figure 23:
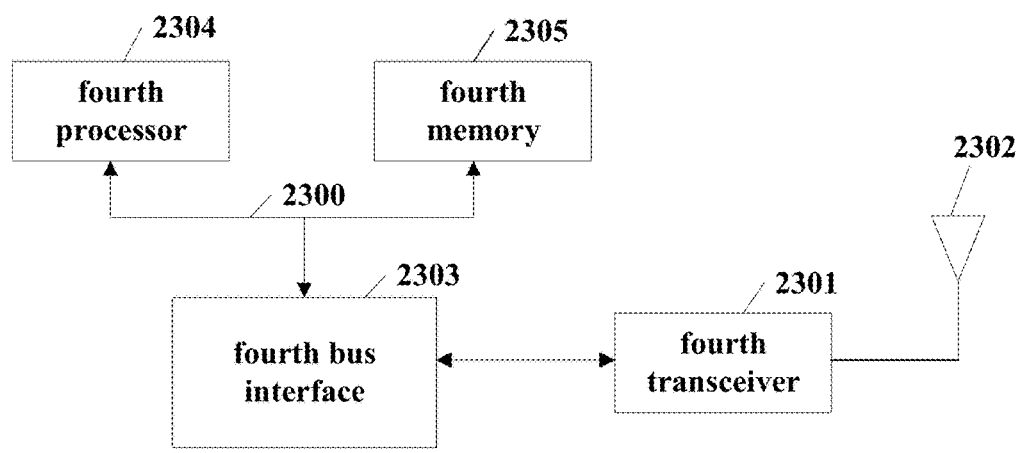
FIG. 23 is a schematic view showing a core network side device according to an embodiment of the present disclosure.

The present disclosure further provides in some embodiments a core network side device which, as shown in FIG. 23, includes a fourth processor, a fourth transceiver 2301 and a fourth memory 2305. The fourth processor 2304 is configured to read a program stored in the fourth memory 2305, so as to receive a fourth message transmitted from a target base station. The fourth message may include seventh information for notifying a device at the core network side that the target base station is incapable of meeting a QoS requirement on one or more flows of a UE.

In FIG. 23, bus architecture (represented by a fourth bus 2300) may include a number of buses and bridges connected to each other, the fourth bus 2300 connects various circuits for one or more processors such as the fourth processor 2304 and one or more memories such as the fourth memory 2305. In addition, the fourth bus 2300 may also be used to connect various other circuits, such as a circuit for a peripheral device, a circuit for a voltage stabilizer and a power management circuit. A fourth bus interface 2303 may be provided between the fourth bus 2300 and the fourth transceiver 2301, and the fourth transceiver 2301 may consist of one element, or more than one element, e.g., a transmitter and a receiver for communication with various other devices over a transmission medium. Data processed by the fourth processor 2304 may be transmitted on a wireless medium via the fourth transceiver 2301 and a fourth antenna 2302. Further, the fourth antenna 2302 may further receive data and transmit the data to the fourth processor 2304 via the fourth transceiver 2301.

The fourth processor 2304 may take charge of managing the fourth bus 2300 as well as general processings, and may further provide various functions such as timing, peripheral interfacing, voltage adjustment, power source management and various other control functions. The fourth memory 2305 may store therein data for the operation of the fourth processor 2304. To be specific, the fourth processor 2304 may be a CPU, an ASIC, an FPGA or a CPLD.

In a possible embodiment of the present disclosure, the fourth message may further include eighth information of QoS parameter capable of being accepted by the target base station and recommended with respect to the one or more flows.

In a possible embodiment of the present disclosure, the fourth processor 2304 is further configured to: transmit updated QoS parameter of the one or more flows to the target base station; and receive a handover response message transmitted from the target base station.

In a possible embodiment of the present disclosure, the fourth processor 2304 is further configured to transmit a fifth message to a source base station. The fifth message may include ninth information indicating the update QoS parameter of the one or more flows.

The present disclosure further provides in some embodiments a computer-readable storage medium storing therein a computer program (instruction). The computer program (instruction) is executed by a processor so as to implement the above-mentioned QoS processing methods in FIGS. 5 to 12.

It should be further appreciated that, such phrases as "one embodiment" and "one of the embodiments" intend to indicate that the features, structures or characteristics are contained in at least one embodiment of the present disclosure, rather than referring to a same embodiment. In addition, the features, structures or characteristics may be combined in any embodiment or embodiments in an appropriate manner.

It should be further appreciated that, serial numbers of the steps shall not be used to define the order of the steps, and instead, the order of the steps shall be determined in accordance with their functions and internal logics.

In addition, the terms "system" and "network" may be replaced with each other.

It should be appreciated that, the expression "and/or" is merely used to describe the relationship between objects, and it includes three relationships. For example, "A and/or B" may represent that, there is only A, there are both A and B, and there is only B. Further, the symbol "/" herein usually refers to "or".

It should be further appreciated that, the expression "B corresponding to A" means that B is associated with A and may be determined in accordance with A. However, when B is determined in accordance with A, it means that B may be determined in accordance with A and/or any other information.

It should be further appreciated that, the device and method may be implemented in any other ways. For example, the embodiments for the apparatus are merely for illustrative purposes, and the units are provided merely on the basis of their logic functions. During the actual application, the units may be provided in other manners; for example, some units and elements may be combined together or integrated into another system. Alternatively, some features may be omitted or not executed. In addition, the coupling connection, direct coupling connection or communication connection between the units or elements discussed herein may be implemented via interfaces, and the indirect coupling connection or communication connection between the devices or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The units implemented in a software form may be stored in a computer-readable medium. These software functional units may be stored in a storage medium and include several instructions so as to enable a computer device (a personal computer, a server or network device) to execute parts of the steps of the transmitting and receiving methods according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are merely preferred embodiments of the present disclosure. It should be appreciated that a person skilled in the art may make further modifications and improvements without departing from the spirit of the present disclosure, and these modifications and improvements shall also fall within the scope of the present disclosure.

What is claimed is:

1. A Quality of Service (QoS) processing method, comprising:
   transmitting, by a target base station, a first message to a source base station,
   wherein the first message at least comprises first information and second information;
   the first information is configured for notifying the source base station that the target base station is incapable of meeting a QoS requirement on one or more flows of a User Equipment (UE); and
   the second information is information of a QoS parameter capable of being accepted by the target base station and recommended with respect to the one or more flows,
   wherein the QoS processing method further comprises:
   transmitting, by the target base station, a second message to a core network,
   wherein the second message comprises third information; and
   the third information is configured for notifying the core network that the target base station is incapable of meeting the QoS requirement on the one or more flows of the UE,
   wherein the second message further comprises fourth information; and
   the fourth information is information of the QoS parameter capable of being accepted by the target base station and recommended with respect to the one or more flows,
   wherein the QoS processing method further comprises:
   receiving, by the target base station, an updated QoS parameter of the one or more flows transmitted from the core network.

2. A target base station, comprising a memory, a processor, and a computer program stored in the memory and executed by the processor, wherein the processor is configured to execute the computer program to implement the steps of the QoS processing method according to claim 1.

3. A non-transitory computer-readable storage medium storing therein a computer program, wherein the computer program is executed by a processor to implement the steps of the QoS processing method according to claim 1.

4. A QoS processing method, comprising:
   receiving, by a source base station, a first message transmitted from a target base station, and acquiring, by the source base station, first information from the first message; and
   transmitting, by the source base station, a third message to a core network,
   wherein the first information is configured for notifying the source base station that the target base station is incapable of meeting a QoS requirement on one or more flows of a UE;
   the third message comprises fifth information;
   the fifth information is configured for notifying the core network that the target base station is incapable of meeting the QoS requirement on the one or more flows of the UE;
   the first message further comprises second information; and
   the second information is information of a QoS parameter capable of being accepted by the target base station and recommended with respect to the one or more flows,
   wherein the third message further comprises sixth information; and
   the sixth information is information of the QoS parameter capable of being accepted by the target base station and recommended with respect to the one or more flows,
   wherein the QoS processing method further comprises:
   receiving, by the source base station, an updated QoS parameter of the one or more flows transmitted from the core network; and
   selecting, by the source base station, a proper target base station in accordance with the updated QoS parameter of the one or more flows, to reinitiate a handover process.

5. A source base station, comprising a memory, a processor, and a computer program stored in the memory and executed by the processor, wherein the processor is configured to execute the computer program to implement the steps of the QoS processing method according to claim 4.

6. A non-transitory computer-readable storage medium storing therein a computer program, wherein the computer program is executed by a processor to implement the steps of the QoS processing method according to claim 4.

7. A QoS processing method, comprising:
   transmitting, by a target base station, a fourth message to a core network,
   wherein the fourth message comprises seventh information; and
   the seventh information is configured for notifying the core network that the target base station is incapable of meeting a QoS requirement on one or more flows of a UE,
   wherein the fourth message further comprises eighth information; and
   the eighth information is information of a QoS parameter capable of being accepted by the target base station and recommended with respect to the one or more flows,
   wherein the QoS processing method further comprises:
   receiving, by the target base station, an updated QoS parameter of the one or more flows transmitted from the core network.

8. The QoS processing method according to claim 7, further comprising:
   receiving, by the target base station, a handover request message transmitted from a source base station via the core network.

9. A target base station, comprising a memory, a processor, and a computer program stored in the memory and executed by the processor, wherein the processor is configured to execute the computer program to implement the steps of the QoS processing method according to claim 7.

10. The target base station according to claim 9, wherein the processor is further configured to execute the computer program to:
    receive a handover request message transmitted from a source base station via the core network.

11. A non-transitory computer-readable storage medium storing therein a computer program, wherein the computer program is executed by a processor to implement the steps of the QoS processing method according to claim 7.

12. The non-transitory computer-readable storage medium according to claim 11, wherein the computer program is further executed by the processor to:
    receive a handover request message transmitted from a source base station via the core network.

* * * * *